US010589621B1

(12) United States Patent
McKoskey et al.

(10) Patent No.: US 10,589,621 B1
(45) Date of Patent: Mar. 17, 2020

(54) TWO-WHEELED VEHICLE

(71) Applicant: Indian Motorcycle International, LLC, Medina, MN (US)

(72) Inventors: G. Jay McKoskey, Forest Lake, MN (US); Jeffrey D. Oltmans, North Branch, MN (US); Pravin Rathore, White Bear Lake, MN (US); Ronald A. Vorndran, Osceola, WI (US)

(73) Assignee: Indian Motorcycle International, LLC, Medina, MN (US)

( * ) Notice: Subject to any disclaimer, the term of this patent is extended or adjusted under 35 U.S.C. 154(b) by 0 days.

(21) Appl. No.: 15/603,673

(22) Filed: May 24, 2017

(51) Int. Cl.
*B60K 13/02* (2006.01)
*B62K 11/04* (2006.01)
*B62K 21/00* (2006.01)
*F02M 35/024* (2006.01)
*F02M 35/12* (2006.01)
*F02M 35/16* (2006.01)

(52) U.S. Cl.
CPC .............. *B60K 13/02* (2013.01); *B62K 11/04* (2013.01); *B62K 21/00* (2013.01); *F02M 35/024* (2013.01); *F02M 35/12* (2013.01); *F02M 35/162* (2013.01)

(58) Field of Classification Search
CPC ........ B62K 13/02; B62K 11/04; B62K 21/00; F02M 35/024; F02M 35/12; F02M 35/162
See application file for complete search history.

(56) References Cited

U.S. PATENT DOCUMENTS

| | | |
|---|---|---|
| 1,988,693 A | 1/1935 | MacLeod |
| 3,978,829 A | 9/1976 | Takahashi et al. |
| 4,011,921 A | 3/1977 | Sakamoto |
| 4,996,768 A | 3/1991 | Seyller |
| 5,279,391 A | 1/1994 | Ward |
| 6,499,956 B2 | 12/2002 | Nakamura |
| 6,510,912 B1 | 1/2003 | Atsuumi |
| 6,598,705 B2 | 7/2003 | Ito et al. |
| 6,666,183 B2 | 12/2003 | Abe et al. |
| 6,772,824 B1 | 8/2004 | Tsuruta |
| 6,789,522 B2 | 9/2004 | Seymour |

(Continued)

OTHER PUBLICATIONS

Harley-Davidson Electronic Throttle Control, Rider Magazine, dated Feb. 12, 2009, http://ridermagazine.com/2009/02/12/2008-h-d-electronic-throttle-control/; 3 pages.

(Continued)

*Primary Examiner* — Joseph M Rocca
*Assistant Examiner* — Marlon A Arce
(74) *Attorney, Agent, or Firm* — Faegre Baker Daniels LLP

(57) ABSTRACT

A vehicle includes a plurality of ground-engaging members and a frame supported by the ground-engaging members. The frame includes a front frame member and a rear frame member coupled to the front frame member. The vehicle also includes a powertrain assembly supported by the frame and an air intake assembly operably coupled to the powertrain assembly and the front frame member. The air intake assembly includes at least one air inlet member extending into a portion of the front frame member. The air inlet member extends from an inlet opening to an outlet opening, and a portion of the air inlet member intermediate the inlet and outlet openings has a diameter less than a diameter of the outlet opening.

26 Claims, 28 Drawing Sheets

(56) References Cited

U.S. PATENT DOCUMENTS

| | | |
|---|---|---|
| 7,040,454 B2 | 5/2006 | Kawamoto et al. |
| 7,178,498 B2 | 2/2007 | Takeuchi |
| 7,240,657 B2 | 7/2007 | Watanabe |
| 7,987,936 B2 | 8/2011 | Yamakura |
| 8,006,792 B2 | 8/2011 | Nakao |
| 8,011,342 B2 | 9/2011 | Bluhm |
| 8,122,990 B2 | 2/2012 | Suzuki |
| 8,128,358 B2 | 3/2012 | McLennan |
| 8,269,457 B2 | 9/2012 | Wenger et al. |
| 8,672,077 B2 | 3/2014 | Sand |
| 9,216,789 B2 | 12/2015 | Hamlin |
| 9,394,859 B2 | 7/2016 | Parnofiello et al. |
| 9,421,860 B2 | 8/2016 | Schuhmacher |
| 9,810,111 B2 | 11/2017 | Sotani et al. |
| 2002/0073980 A1 | 6/2002 | Abe et al. |
| 2004/0226531 A1* | 11/2004 | Kino ............ B01D 46/10 123/184.21 |
| 2004/0244761 A1 | 12/2004 | Takeuchi |
| 2004/0245050 A1 | 12/2004 | Kawamoto et al. |
| 2005/0217909 A1 | 10/2005 | Guay et al. |
| 2006/0113133 A1 | 6/2006 | Berkovic |
| 2006/0288976 A1 | 12/2006 | Watanabe |
| 2008/0073980 A1 | 3/2008 | Wang et al. |
| 2008/0218018 A1 | 9/2008 | Zhang et al. |
| 2010/0012074 A1 | 1/2010 | Asaya |
| 2010/0078242 A1 | 4/2010 | Suzuki |
| 2010/0193275 A1* | 8/2010 | Song ............ B62K 11/04 180/219 |
| 2010/0243352 A1 | 9/2010 | Watanabe et al. |
| 2011/0240392 A1 | 10/2011 | Iwata |
| 2012/0073527 A1 | 3/2012 | Oltmans et al. |
| 2012/0247418 A1 | 10/2012 | Tanaka et al. |
| 2013/0118444 A1 | 5/2013 | Harada |
| 2014/0261258 A1 | 9/2014 | Fronk et al. |
| 2014/0262580 A1* | 9/2014 | Bagnariol ............ B60G 7/006 180/218 |
| 2014/0291051 A1 | 10/2014 | Yoshida |
| 2014/0360448 A1 | 12/2014 | Chittenden |
| 2015/0129342 A1* | 5/2015 | O'Rourke ............ B62J 17/04 180/219 |
| 2015/0308299 A1 | 10/2015 | Dautel et al. |
| 2016/0017841 A1 | 1/2016 | Harada |
| 2016/0075393 A1* | 3/2016 | Eder ............ B62K 11/02 280/279 |
| 2017/0021719 A1 | 1/2017 | Jyouzaki |
| 2017/0089308 A1* | 3/2017 | Yamashita ............ B60K 13/02 |
| 2018/0010558 A1* | 1/2018 | Matsuda ............ F02M 35/10347 |

OTHER PUBLICATIONS

RD-300-16-6061-L, www.burnsstainless.com/rd-300-400-16/6061-1.aspx, available as early as May 20, 2016; 2 pages.

Part Finder for 2015 Cross Country, Polaris Industries, Inc., copyright 2010; 7 pages.

Part Finder for 2015 Vision, Polaris Industries, Inc., copyright 2009; 7 pages.

* cited by examiner

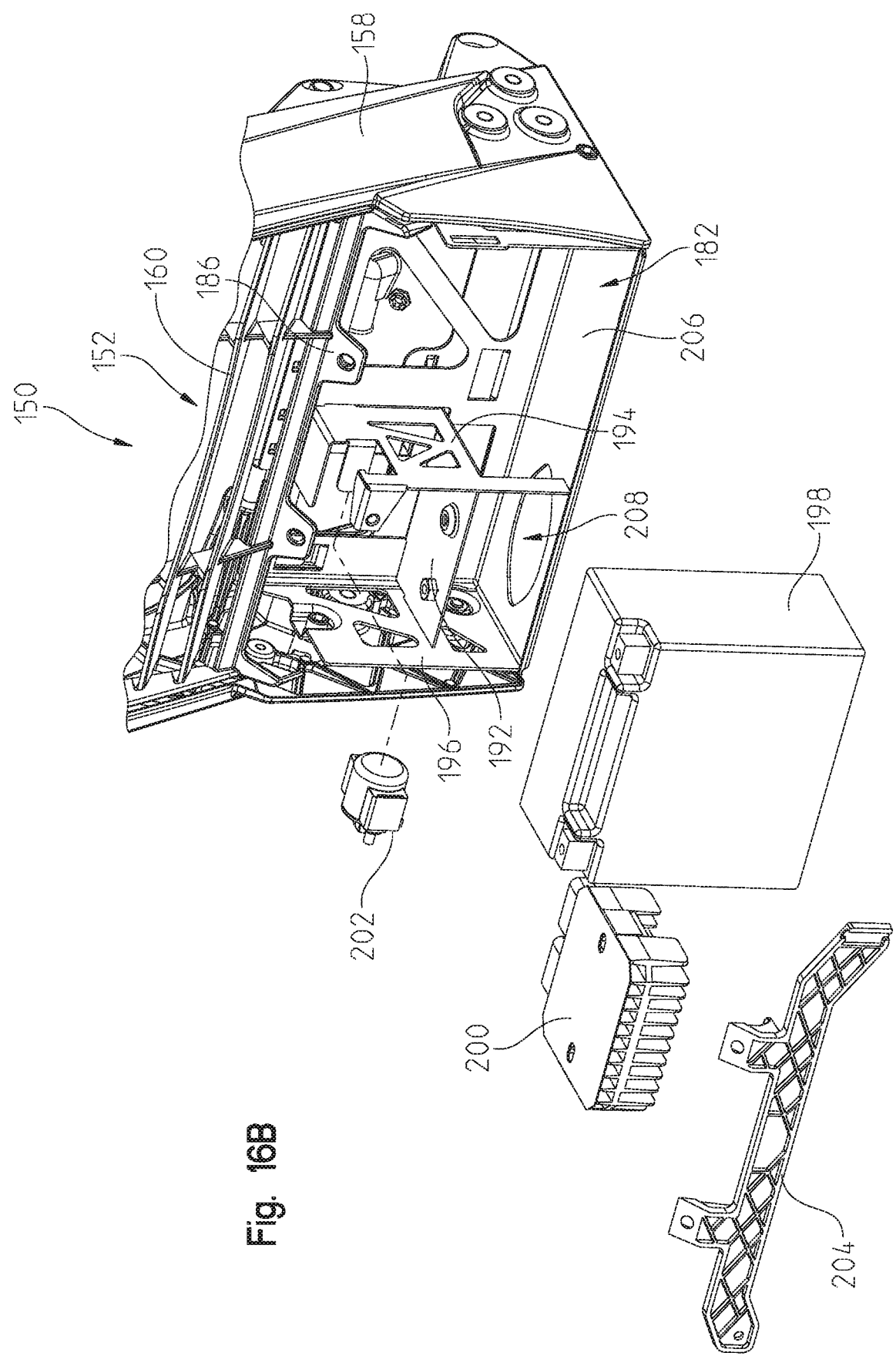

TWO-WHEELED VEHICLE

FIELD OF THE PRESENT DISCLOSURE

The present disclosure relates to a two-wheeled vehicle and, more particularly, to a two-wheeled vehicle having an air intake system and a cooling system.

BACKGROUND OF THE PRESENT DISCLOSURE

Many vehicles include a powertrain assembly with an engine and a transmission. The engine requires air for combustion which provides motive power to the vehicle. Additionally, the engine also may need to be cooled when operating to prevent overheating. As such, vehicles typically include both an air intake assembly and a cooling assembly to facilitate operation of the engine.

Some vehicles, including two-wheeled vehicles (e.g., motorcycles), may have limited space available for accommodating an air intake assembly and a cooling assembly. As such, various components of the air intake assembly and/or cooling assembly may be packaged within other components of the vehicle (e.g., the frame) to reduce the size or footprint of the vehicle.

SUMMARY OF THE PRESENT DISCLOSURE

In an exemplary embodiment of the present disclosure, a vehicle comprises a plurality of ground-engaging members and a frame supported by the ground-engaging members. The frame includes a front frame member and a rear frame member coupled to the front frame member. The vehicle also comprises a powertrain assembly supported by the frame and an air intake assembly fluidly coupled to the powertrain assembly and the front frame member. The air intake assembly includes at least one air inlet member extending into a portion of the front frame member. The air inlet member extends from an inlet opening to an outlet opening, and a portion of the air inlet member intermediate the inlet and outlet openings has a diameter less than a diameter of the outlet opening.

In a further exemplary embodiment of the present disclosure, a vehicle comprises a plurality of ground-engaging members and a frame supported by the ground-engaging members. The frame includes a front frame member and a rear frame member coupled to the front frame member. The vehicle further comprises a powertrain assembly supported by the frame and an air intake assembly fluidly coupled to the powertrain assembly and the front frame member. The air intake assembly includes at least one air inlet member extending into a portion of the front frame member and a filter positioned longitudinally rearward of the at least one air inlet member. The air intake assembly also includes a plurality of torque tubes fluidly coupled to the powertrain assembly and positioned longitudinally rearward of the filter.

In yet another embodiment of the present invention, a vehicle comprises a plurality of ground-engaging members and a frame supported by the ground-engaging members. The frame includes a front frame member and a rear frame member coupled to the front frame member. The vehicle further comprises a powertrain assembly supported by the frame and a cooling assembly fluidly coupled to the powertrain assembly. The cooling assembly includes a heat exchanger, a fan coupled to the heat exchanger, and a cover coupled to the fan. The cover is sized to conceal a first portion of the fan and a second portion of the fan is exposed.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 16B is a further exploded view of the compartment of FIG. 15;

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a motorcycle, it should be understood, that the invention may have application to other types of vehicles such as all-terrain vehicles, snowmobiles, watercrafts, utility vehicles, scooters, golf carts, and mopeds.

Figure 4:
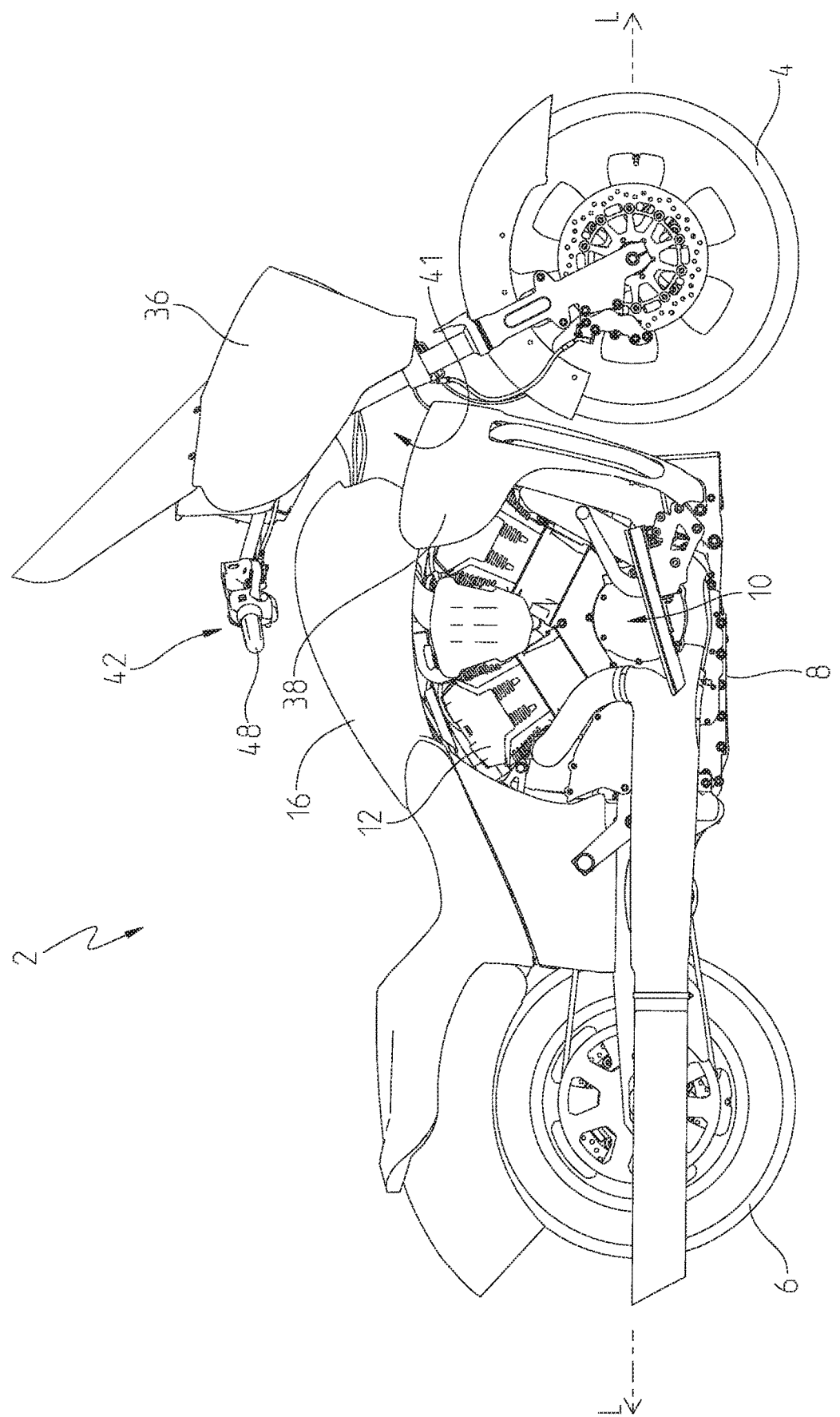
FIG. 4 is a right side view of the vehicle of FIG. 1.
Figure 14:
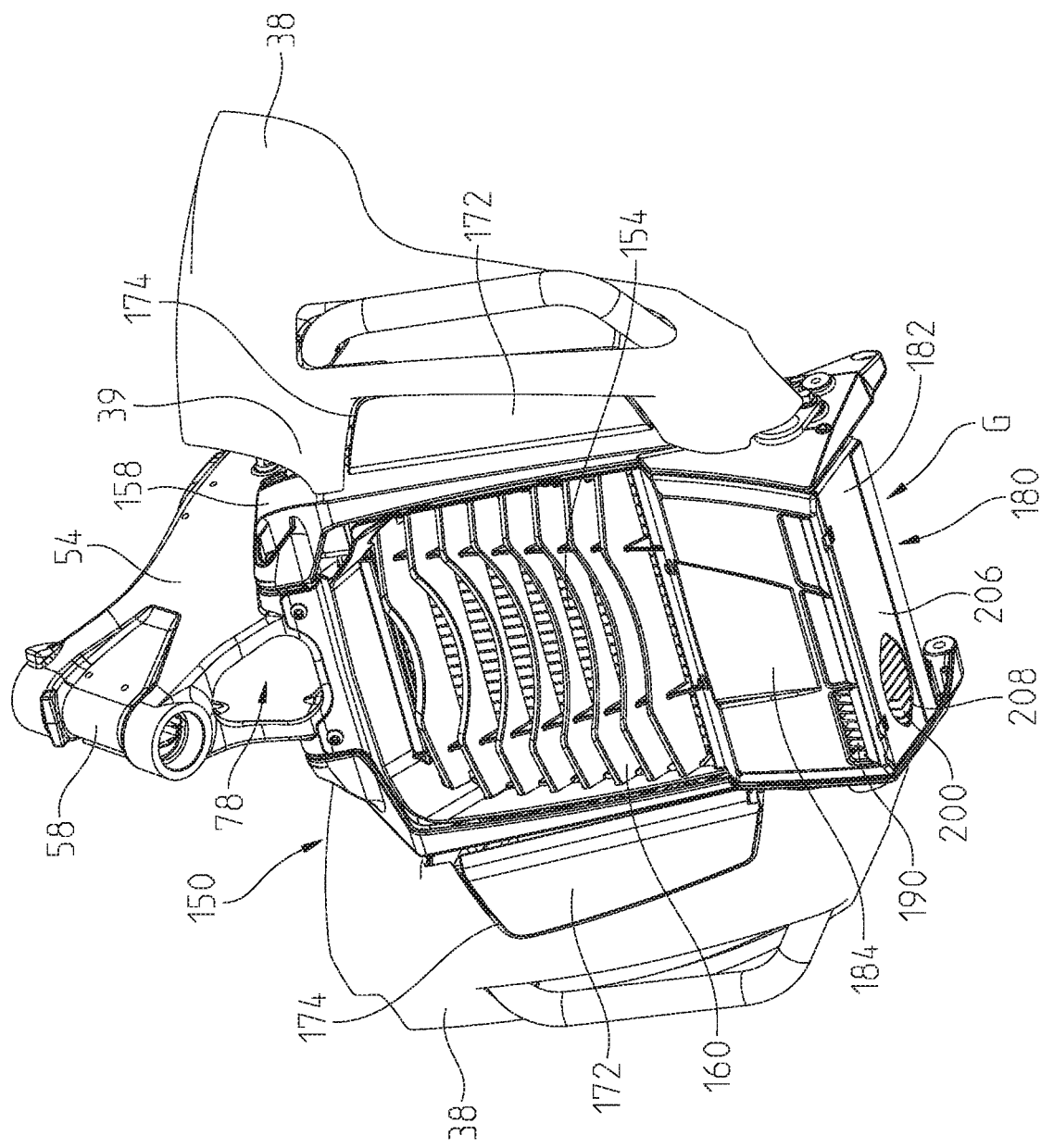
FIG. 14 is a left front perspective view of an underside of the cooling assembly of FIG. 12 and a compartment for components of the vehicle of FIG. 1.

With reference to FIGS. 1-4, an illustrative embodiment of a vehicle 2 is shown. Vehicle 2 is shown as a two-wheeled vehicle, such as a motorcycle, which includes a front wound-engaging member 4, a rear ground-engaging member 6, and a frame assembly 8 supported by ground-engaging members 4, 6 and extending longitudinally along a longitudinal axis L (FIG. 4). Frame assembly 8 includes at least a front frame portion 54 (FIG. 5) and a rear frame portion 56 (FIG. 19) coupled to each other. Front frame portion 54 illustratively includes a head tube 58 configured to support additional components of vehicle 2 (e.g., portions of a steering assembly, such as a steering post). In one embodiment, front frame portion 54 is a casting which includes head tube 58. Portions of frame assembly 8, including head tube 58, may be concealed by a body assembly 34, which includes an upper fairing 36 and a lower fairing 38 which extends approximately from front frame portion 54 to a compartment or battery box 180 of vehicle 2 (FIG. 14). Vehicle 2 also includes a powertrain assembly 10 supported by frame assembly 8. Powertrain assembly 10 includes at least an engine 12 and a transmission 14. Transmission 14 may be a shift able transmission or a continuously variable transmission. A fuel tank 16 is fluidly coupled to engine 12 and configured to supply fuel thereto for combustion during operation of engine 12. Additional details of engine 12 may be disclosed in U.S. patent application Ser. No. 15/166,509, filed May 27, 2016, and entitled "ENGINE", the complete disclosure of which is expressly incorporated by reference herein.

Referring still to FIGS. 1-4, a seat assembly 18 is coupled to frame assembly 8 and is positioned generally above at least a portion of powertrain assembly 10. Seat assembly 18 includes an operator seat 20, defined by a seat bottom 22 and a seat back 24, and a passenger seat 26, defined by a seat bottom 28 and a seat back 30.

Figure 2:
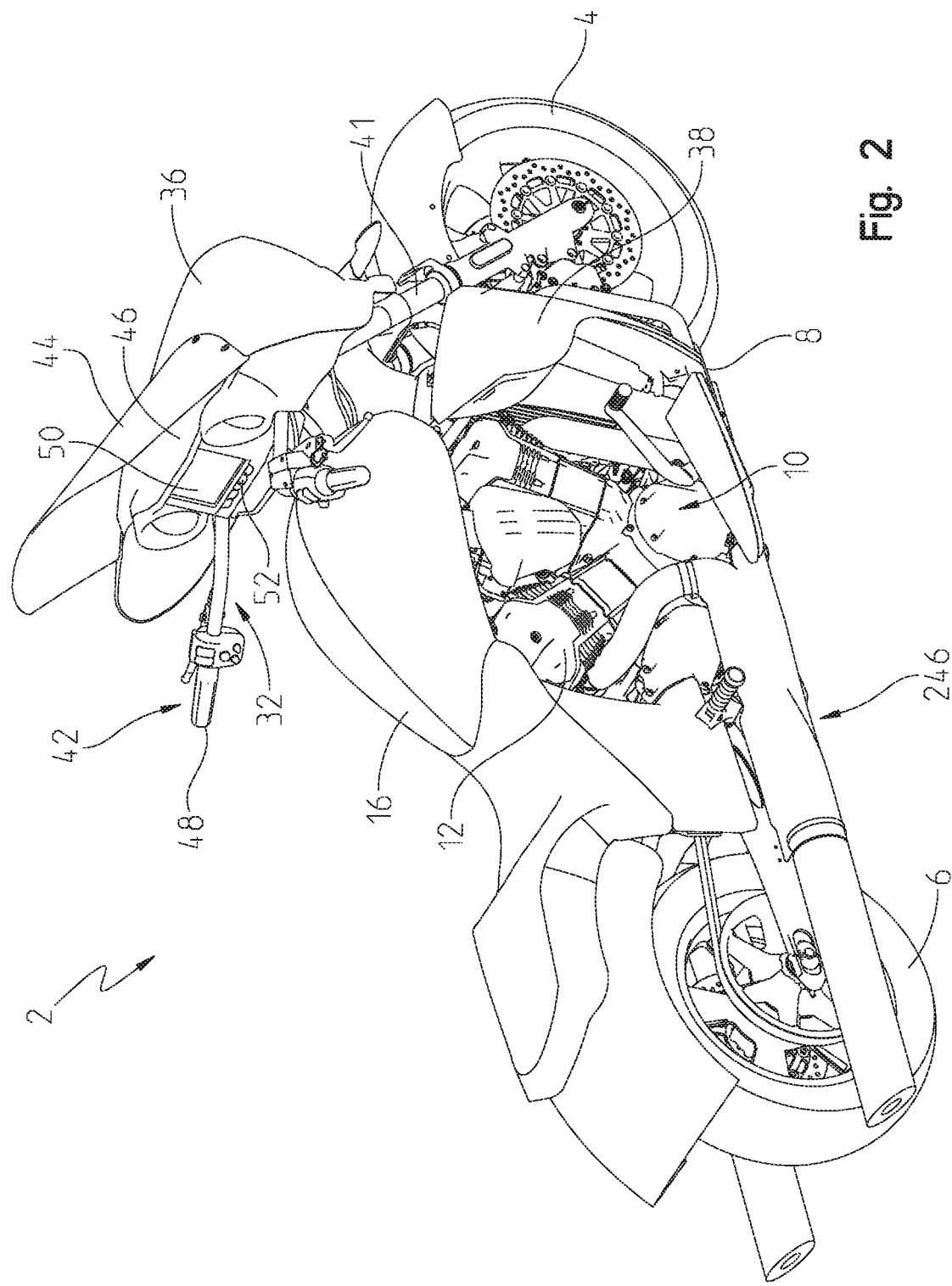
FIG. 2 is a right rear perspective view of the vehicle of FIG. 1.
Figure 3:
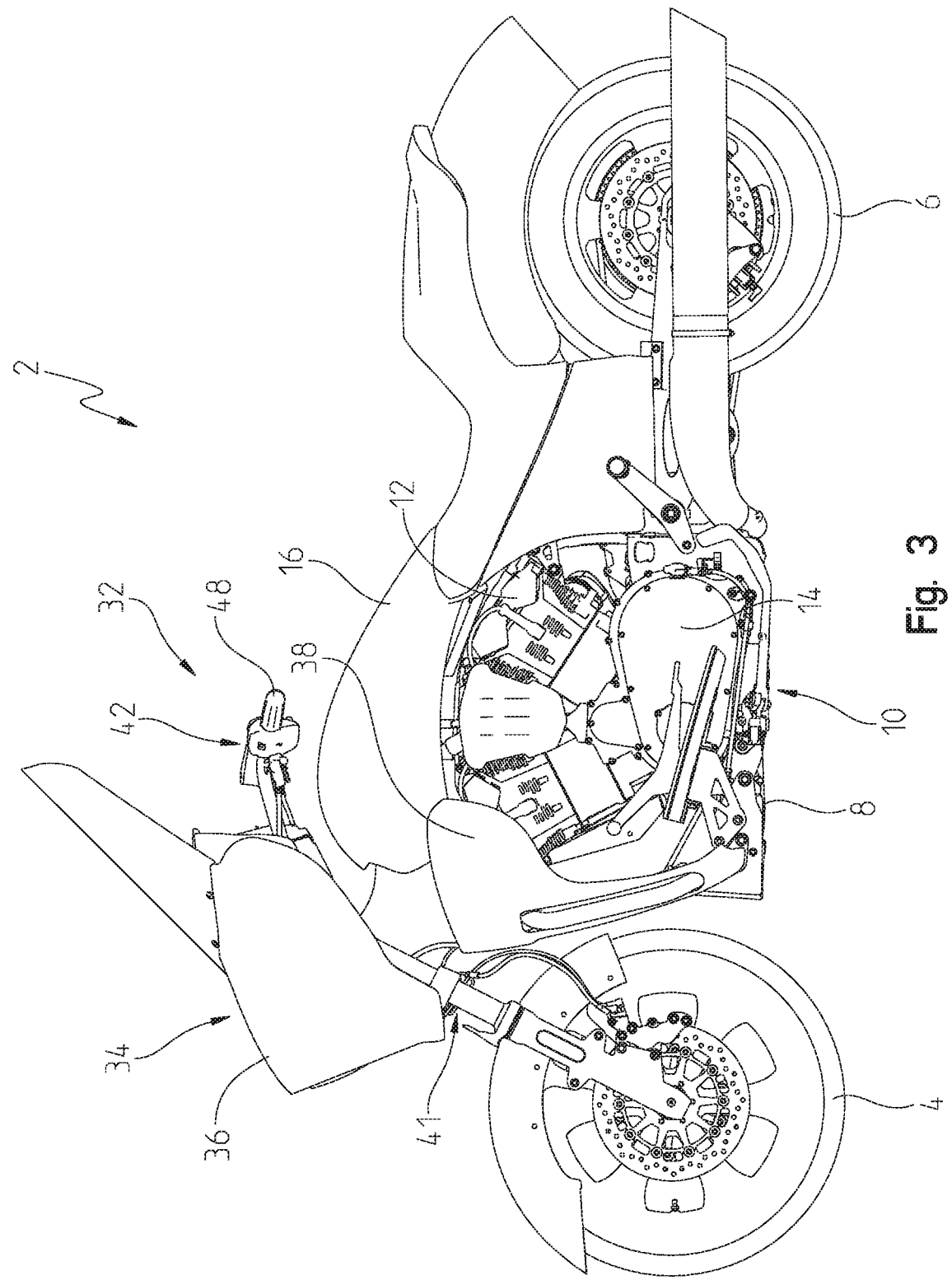
FIG. 3 is a left side view of the vehicle of FIG. 1.

Referring to FIG. 2, vehicle 2 includes an operator area 32 positioned generally forward of seat assembly 18 and rearward of at least a portion of upper fairing 36. Upper fairing 36 is coupled to a triple clamp assembly 41 of vehicle 2. Triple clamp assembly 41 is operably coupled to a portion of frame assembly 8 and is operably coupled to a steering assembly 42. Additional details of upper fairing 36 and triple clamp assembly 41 may be disclosed in U.S. patent application Ser. No. 14/077,037, the complete disclosure of which is expressly incorporated by reference herein.

As shown in FIG. 1-4, operator area 32 includes seat assembly 18 and steering assembly 42 and also may include a windshield 44 and a dash assembly 46. Illustratively, steering assembly 42 defines handlebars having gripping surfaces 48 for the operator's hands. Alternatively, steering assembly 42 may be a steering wheel or any other steering device configured to turn vehicle 2. Additionally, in one embodiment, windshield 44 is configured to move between a raised position which shields the operator from at least some air/wind when vehicle 2 is moving and a lowered positioned in which may expose the operator to air/wind when vehicle 2 is moving. Additional details of windshield 44 may be disclosed in U.S. patent application Ser. No. 14/078,487, filed on Nov. 12, 2013, and entitled "TWO-WHEELED VEHICLE", the complete disclosure of which is expressly incorporated by reference herein.

Referring to FIG. 2, dash assembly 46 of operator area 40 includes at least one display 50. Display 50 may be a touch-screen display with a plurality of pixels configured to change in response to an operator input. For example, the operator may use his/her finger to select options on first display 50 and receive information about vehicle 2, ambient conditions, etc. Additionally, dash assembly 46 may support a plurality of inputs 52 positioned adjacent display 50 which also allow the operator to change the information presented on display 50 and also access various features of vehicle 2 (e.g., a radio, GPS, Bluetooth®. Additional details of display 50 and inputs 52 are may be disclosed in U.S. patent application Ser. No. 14/985,673, filed Dec. 31, 2015, and entitled "TWO-WHEELED VEHICLE" and U.S. patent application Ser. No. 15/161,720, filed May 23, 2016, and entitled "DISPLAY SYSTEMS AND METHODS FOR A RECREATIONAL VEHICLE", the complete disclosures of which are expressly incorporated by reference herein.

Figure 5:
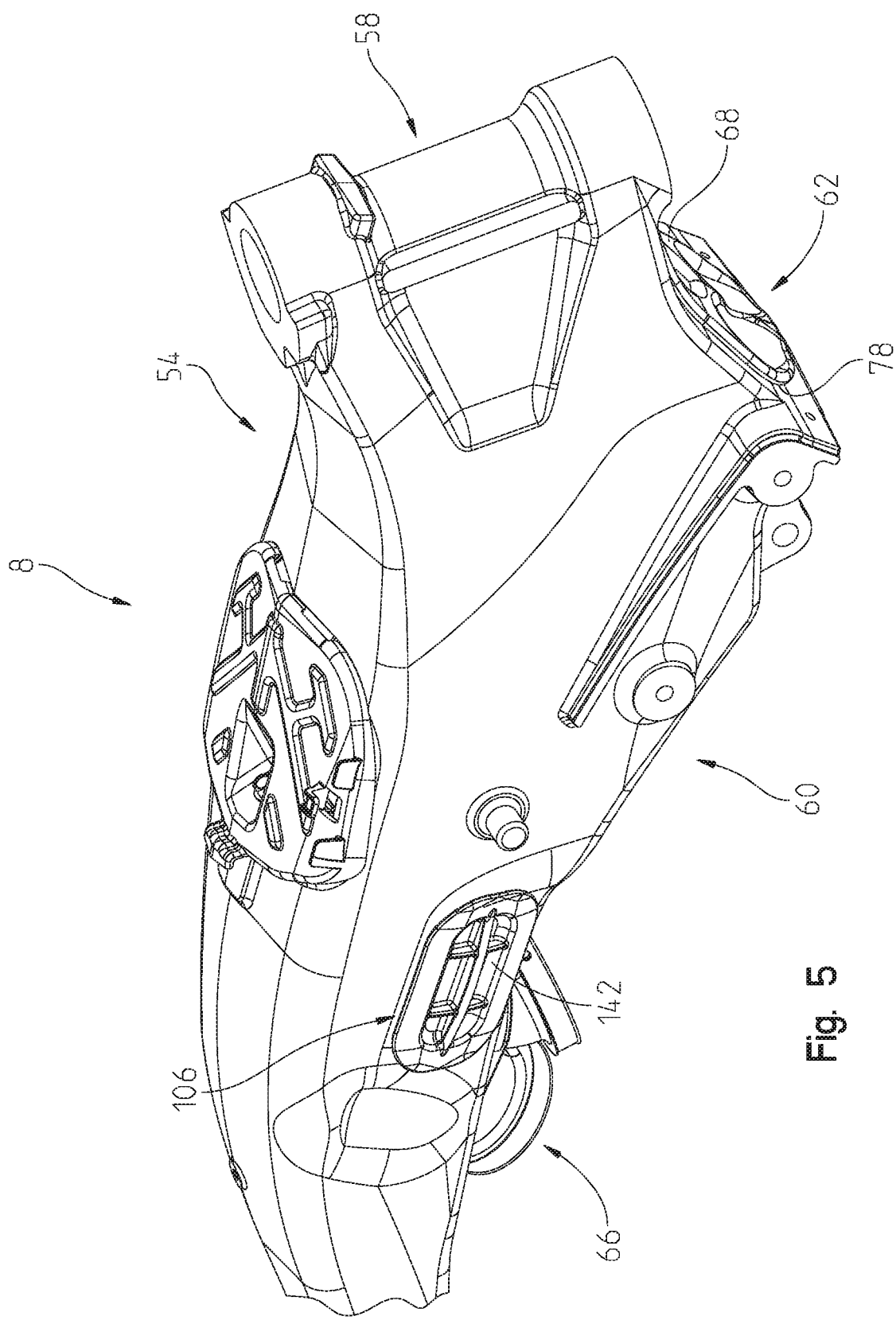
FIG. 5 is a right front perspective view of a front frame portion of the vehicle of FIG. 1 supporting an air intake assembly.
Figure 6:
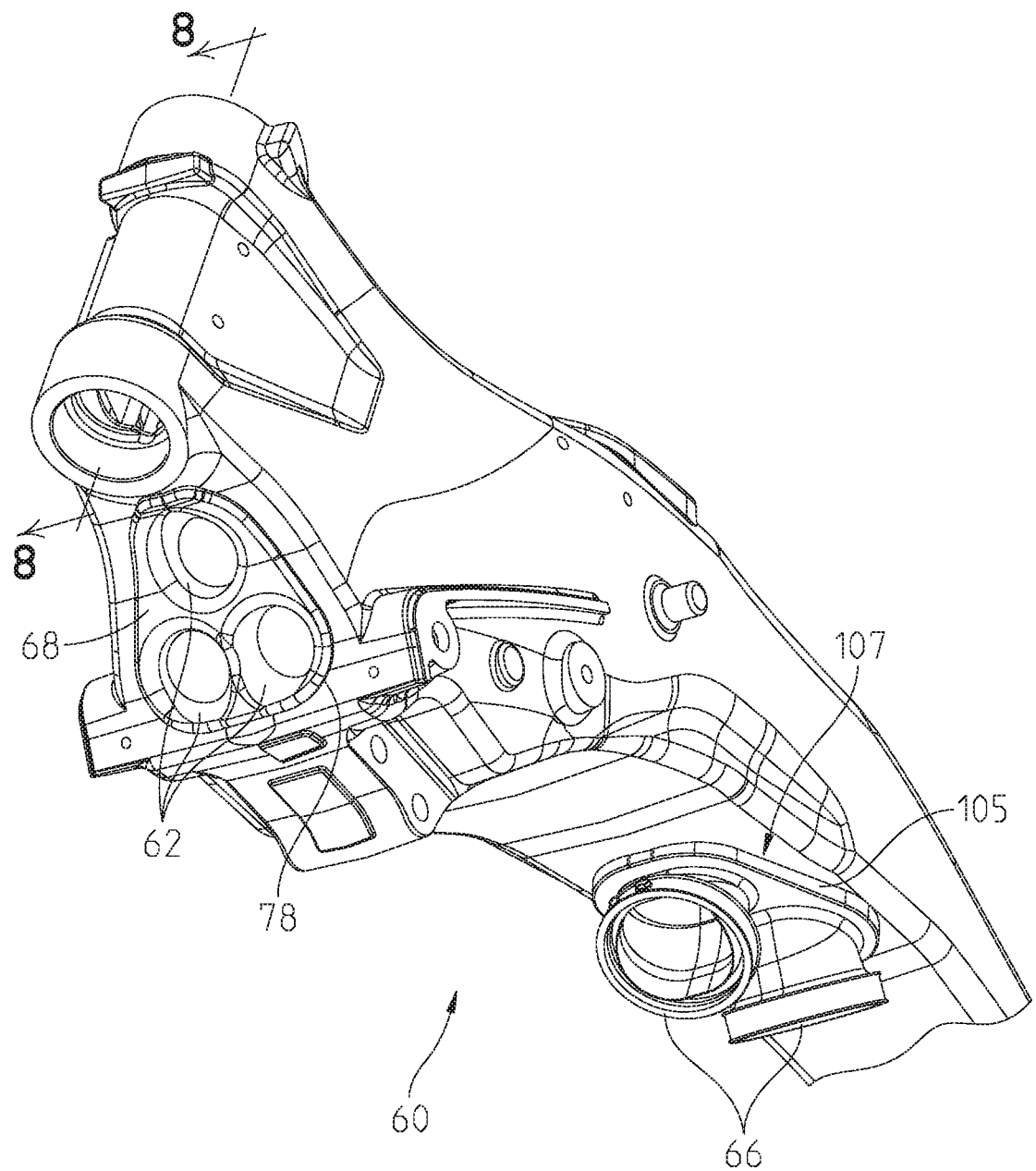
FIG. 6 is a left front perspective view of the underside of the front frame portion and a portion of the air intake assembly of FIG. 5.
Figure 7:
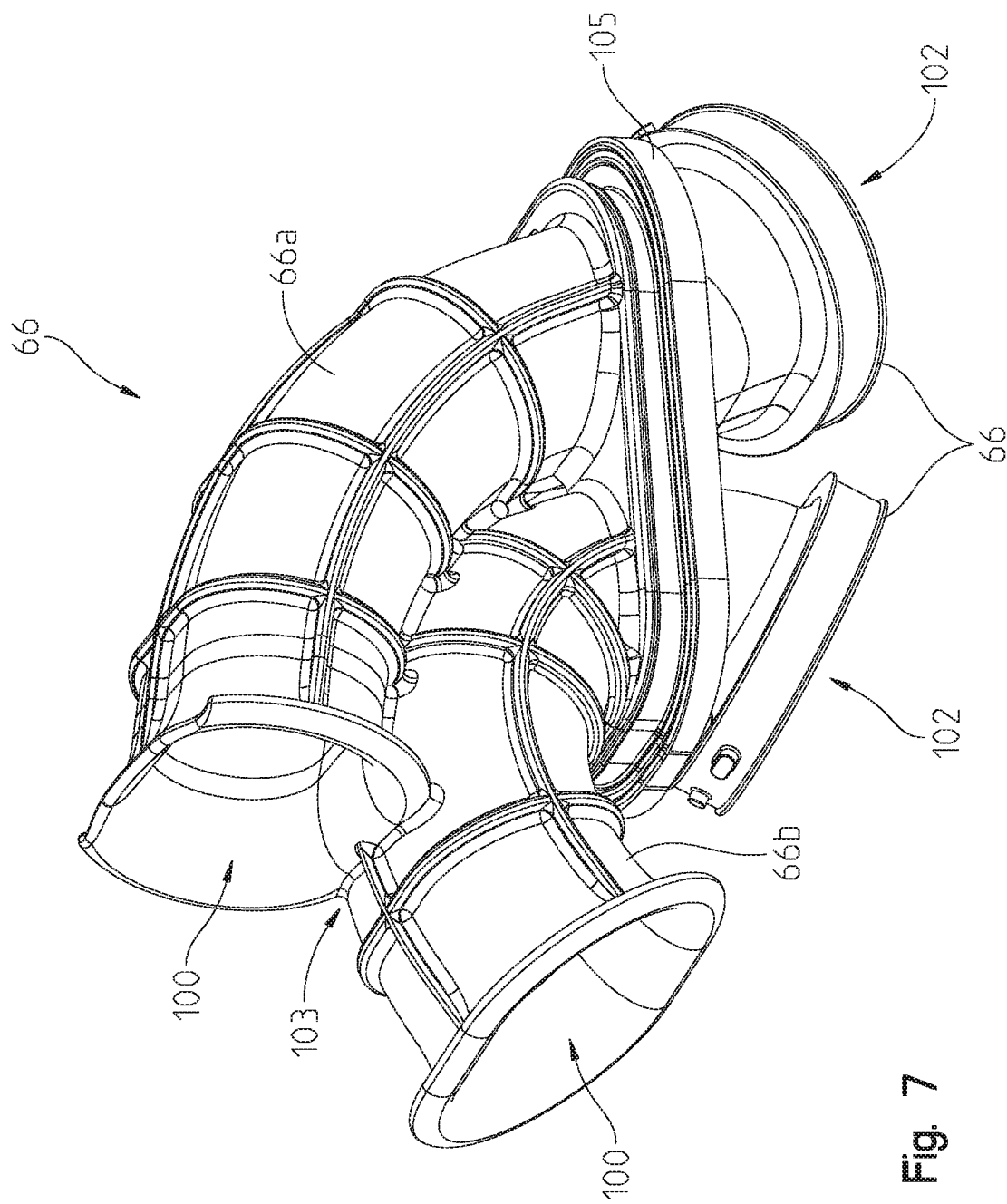
FIG. 7 is a left front perspective view of torque tubes of the air intake assembly of FIG. 6.
Figure 8:
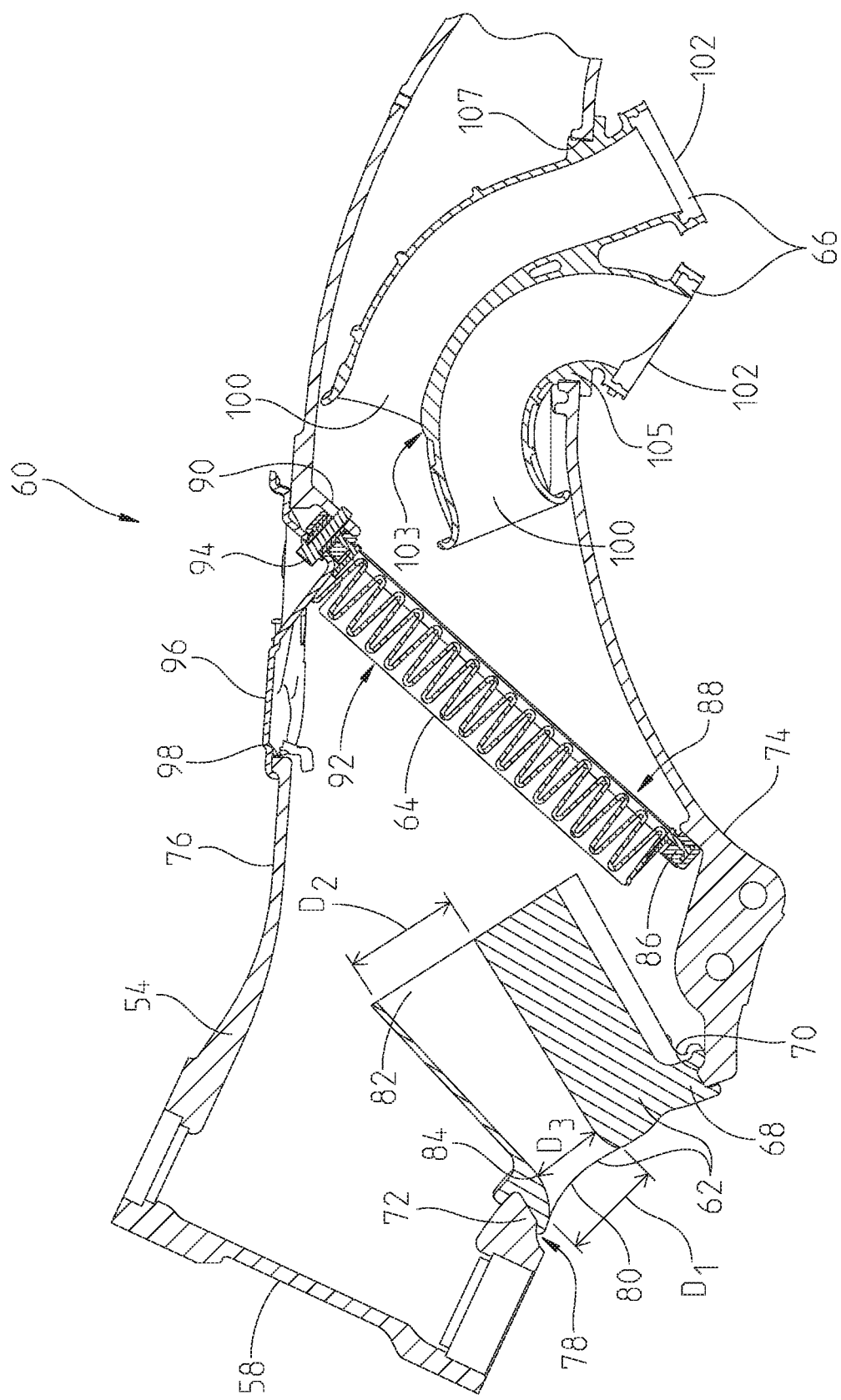
FIG. 8 is a cross-sectional view of the front frame portion and the air intake assembly of FIG. 5, taken along line 8-8 of FIG. 6.

Referring to FIGS. 5-11, vehicle 2 also includes an air intake assembly 60 supported by front frame portion 54 and configured to provide air to engine 12 for combustion therein. Illustratively, air intake assembly 60 includes at least one air intake tube 62, a filter 64 (FIG. 8), and torque tubes 66. In one embodiment, air intake tube 62 includes three air intake tubes 62 which provide the same volume of air into front frame member 54 as would one single (but longer) air intake tube. Air intake tubes 62 may be coupled together or may be separate tubes. Air intake tubes 62 may be coupled together through a seal or plate 68 which includes a groove or recess 70. Groove 70 is configured to sealingly receive a shoulder or flange 72 of front frame portion 54 to couple air intake tubes 62 to front frame portion 54. As shown in FIGS. 5, 6, and 8, air intake tubes 62 are positioned at a forward portion of front frame portion 54 and are longitudinally rearward of head tube 58. Illustratively, air intake tubes 62 are coupled to a lower or bottom surface 74 of front frame portion 54 and are spaced apart from an upper or top surface 76 of front frame portion 54. More particularly, air intake tubes 62 are received within an opening 78 (FIG. 14) on lower surface 74 of front frame portion 54.

Because air intake tubes 62 are coupled to lower surface 74 of front frame portion 54, air intake tubes 62 extend into front frame portion and are angled rearwardly. More particularly, each air intake tube 62 includes an air inlet opening 80 and an air outlet opening 82 which is angled upwardly and rearwardly relative to air inlet opening 80. Air inlet opening 80 has a diameter $D_1$ of approximately 45-55 mm and, more particularly, approximately 51.4 mm. Additionally, air outlet opening 82 has a diameter $D_2$ of approximately 50-60 mm and, more particularly, approximately 55.3 mm. Each air intake tube 62 extends continuously between air inlet opening 80 and air outlet opening 82 and has a constricted or narrowed portion 84 intermediate openings 80, 82. Narrowed portion 84 has a diameter $D_3$ of approximately 30-40 mm and, more particularly, approximately 35.0 mm. The length of each air intake tube 62 is approximately equal, as shown in FIG. 8, however, in alternative embodiments, each air intake tube 62 may have a different length.

Narrowed portion 84 of air intake tubes 62 attenuates noise from the air coming into front frame portion 54 through air intake tubes 62. More particularly, by reducing the diameter of air intake tubes 62 adjacent air inlet opening 80, noise produced by the incoming air is reduced, however, by increasing the diameter of air intake tubes 62 downstream of narrowed portion 84 (e.g., at air outlet opening 82), sufficient air flow/volume is maintained for engine 12. More particularly, and according to the Venturi Effect, the velocity of the air flowing through air intake tubes 62 increases when flowing through narrowed portion 84 but the static pressure of the air at narrowed portion 84 decreases. Therefore, any increase in kinetic energy of the air flow due to the increased velocity at narrowed portion 84 is balanced by the decrease in the static pressure of the air flow at narrowed portion 84. As such, the configuration of air intake tubes 62 having narrowed portion 84 which cooperates with a tapered or wider diameter at air outlet opening 82 allows for proper air flow through air intake tubes 62 for operation of engine 12 and also for a reduction in sound emanating from air intake assembly 60 due to narrowed portion 84.

Figure 9:
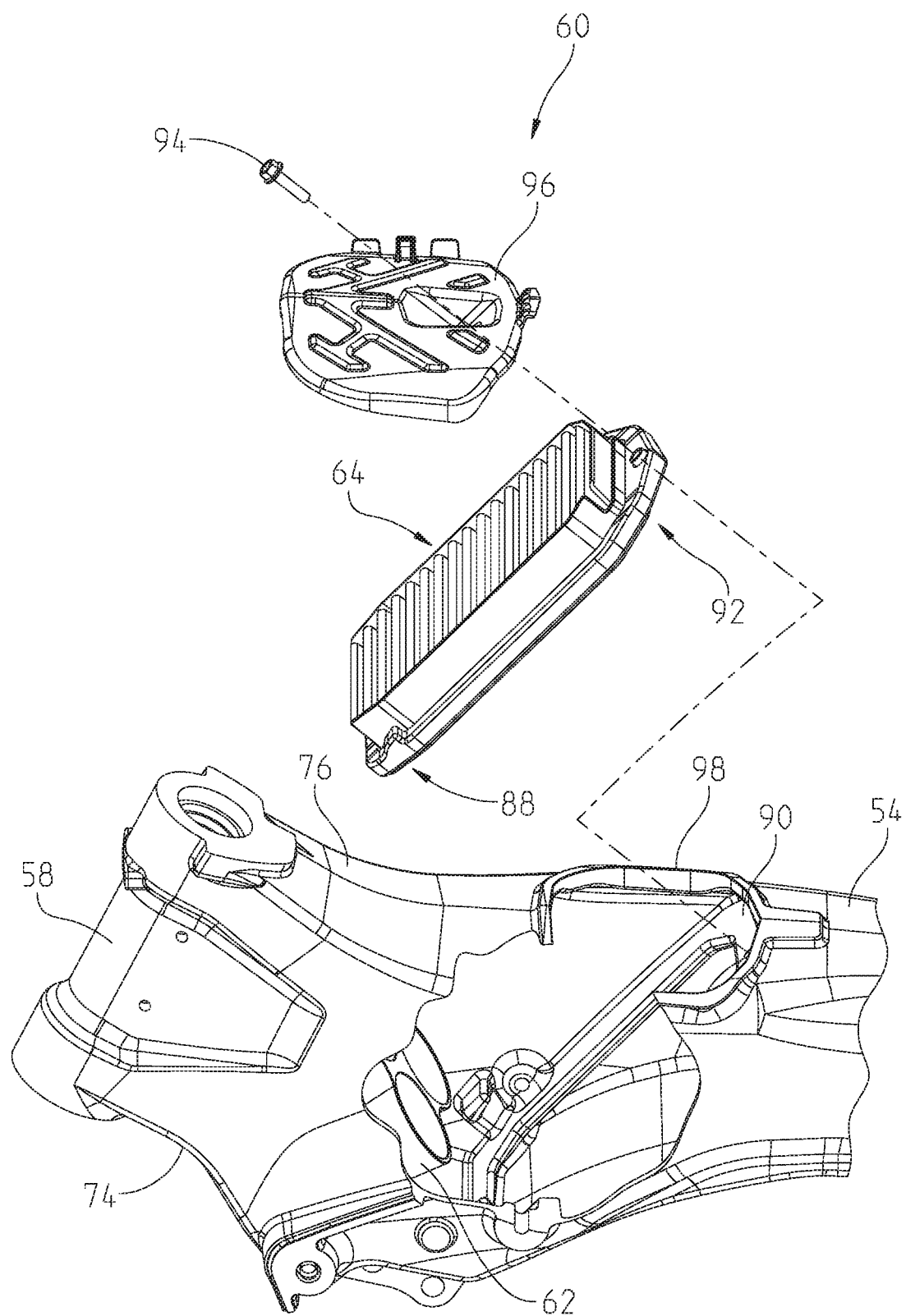
FIG. 9 is an exploded view of the front frame portion and a portion of the air intake assembly of FIG. 5.

As shown in FIGS. 8 and 9, once air flows through air intake tubes 62, the air flows through front frame portion 54 which provides the function of an air box by containing a volume of air directed to engine 12 for combustion. Once the air is within the inner volume of front frame portion 54, the air flows through filter 64 to remove debris and particulate matter from the air before the air enters engine 12. Illustratively, filter 64 is contained within front frame portion and is coupled to both lower and upper surfaces 74, 76 of front frame portion. More particularly, lower surface 74 of front frame portion 54 includes a bracket or tab 86 configured to receive a lower portion 88 of filter 64. In this way, lower portion 88 of filter 64 may be removably coupled to lower surface 74 of front frame portion 54. Additionally, upper surface 76 of front frame portion 54 includes a partial wall 90 which couples to an upper portion 92 of filter 64 with a fastener 94. Fastener 94 also couples a cover 96 to filter 64 and wall 90. Cover 96 conceals an opening 98 along upper surface 76 of front frame portion 54. As such, filter 64 is removable from front frame portion 54 for maintenance or replacement by removing fastener 94 and exposing opening 98 when cover 96 is removed.

Referring to FIGS. 5-8, air intake assembly 60 also includes at least one, and illustratively two, torque tubes 66 which are positioned longitudinally rearward of filter 64. As such, filter 64 is positioned longitudinally intermediate air intake tubes 62 and torque tubes 66. Illustratively, air intake assembly 60 includes two torque tubes 66 and each torque tube 66 includes an air inlet 100 and an air outlet 102. In one embodiment, torque tubes 66 are coupled together such that air inlet 100 of an upper torque tube 66a is integrally formed with a body portion of a lower toque tube 66b at a position 103. Alternatively, upper and lower torque tubes 66a, 66b may be separate from each other.

Figure 1:
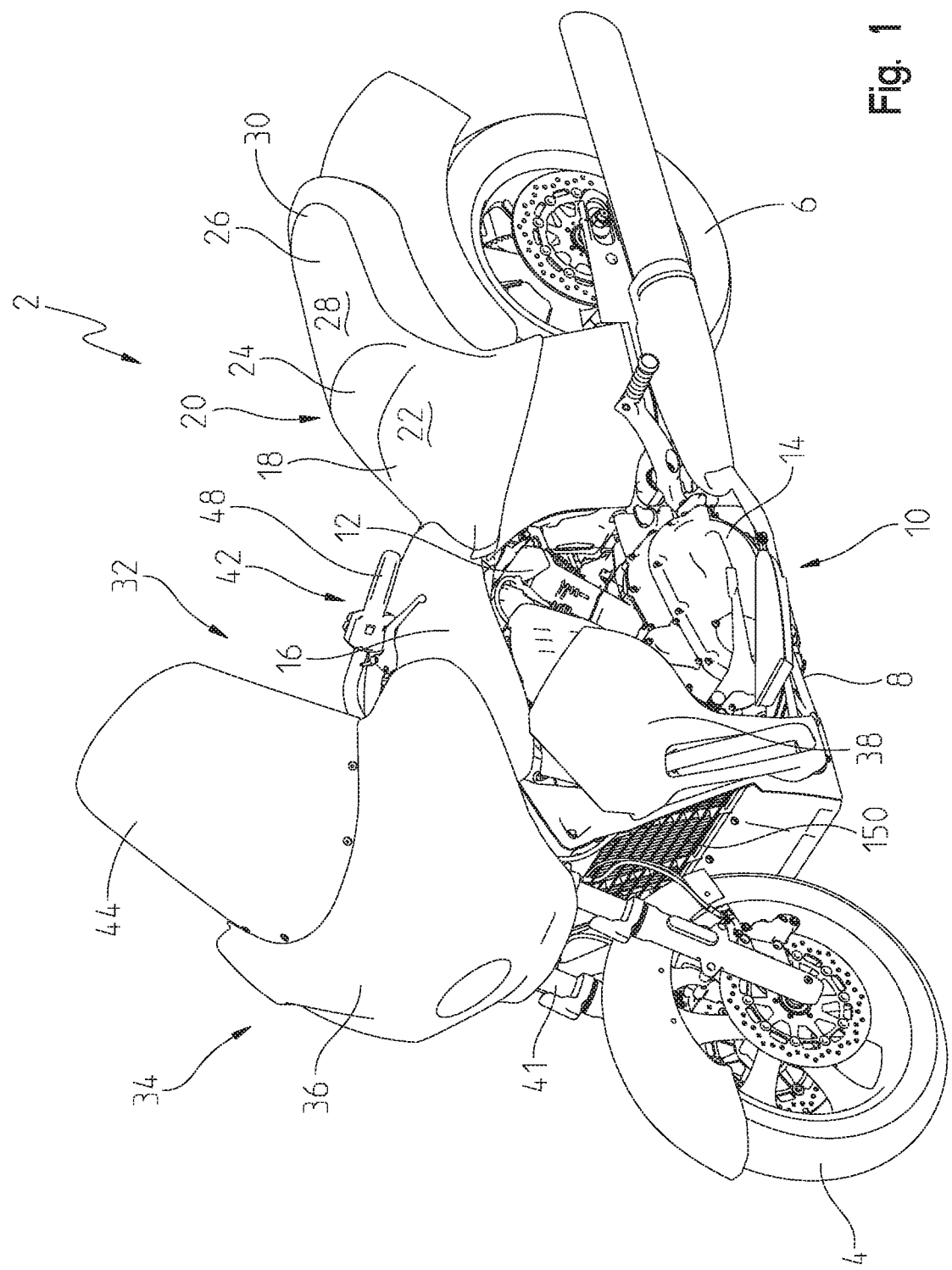
FIG. 1 is a left front perspective view of a vehicle of the present disclosure.

As shown in FIG. 8, air inlets 100 are positioned adjacent upper surface 76 of front frame portion 54 and air outlets 102 extend from lower surface 74 of front frame portion 54. More particularly, air outlets 102 are positioned outside of and below front frame portion 54 to couple with a throttle body (not shown in FIG. 8) of powertrain assembly 10 to provide combustion air to engine 12 (FIG. 1). In one embodiment, torque tubes 66 are curved and are configured to receive the air entering front frame portion 54 through air intake tubes 62 after the air flows through filter 64. In this way, "clean" or filtered air is provided to engine 12 through torque tubes 66. Torque tubes 66 also are sealed to lower surface 74 of front frame portion 54 with a flange or seal 105 positioned intermediate inlets 100 and outlets 102 of torque tubes 66. In one embodiment, flange 105 is integrally formed with the body of torque tubes 66 and is configured to hermetically seal against front frame portion to prevent air, water, or other fluid from flowing into or out of front frame portion 54 through an opening 107 of front frame portion 54.

Figure 10:
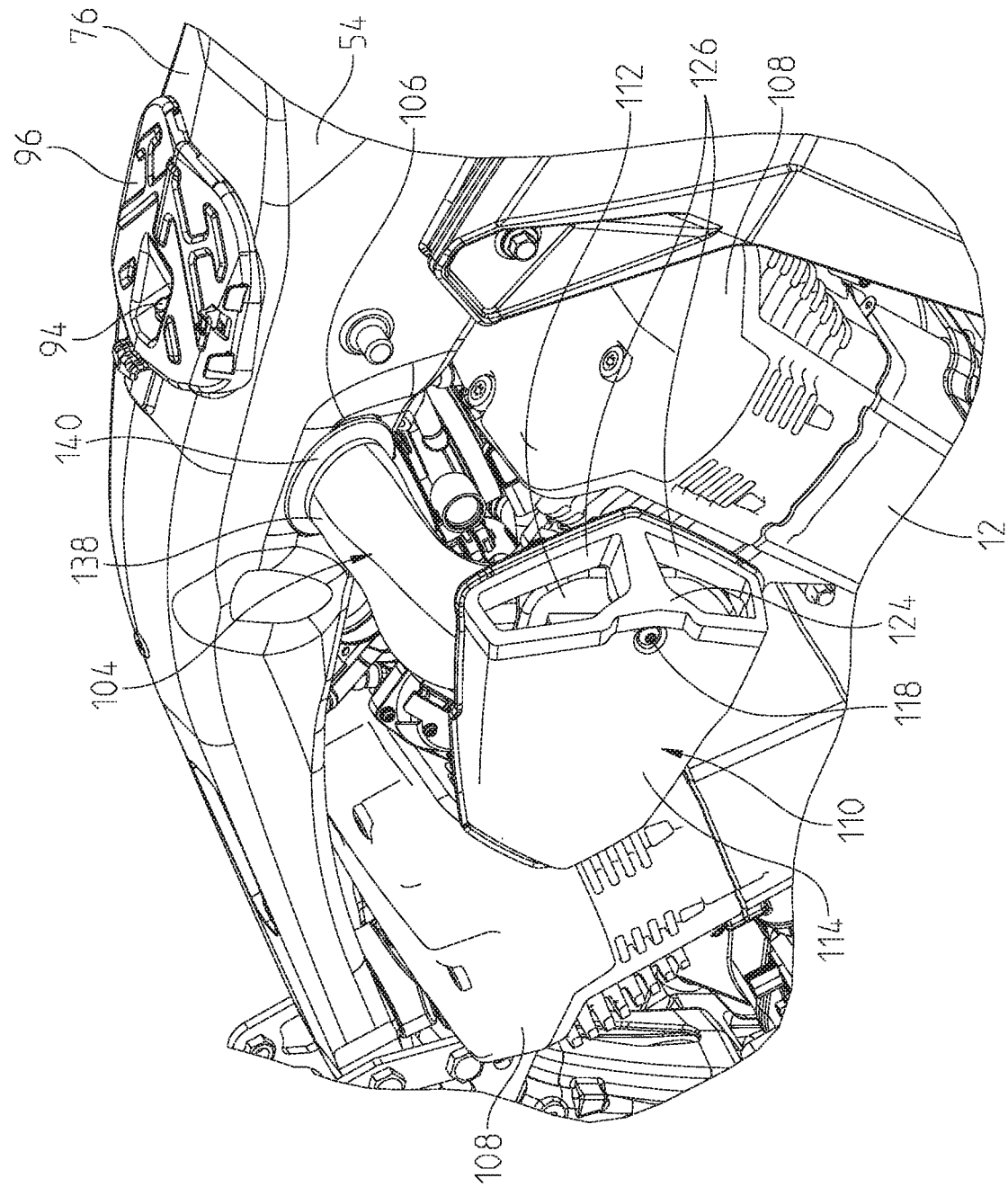
FIG. 10 is a right front perspective view of an accessory air intake assembly of the vehicle of FIG. 1.
Figure 11:
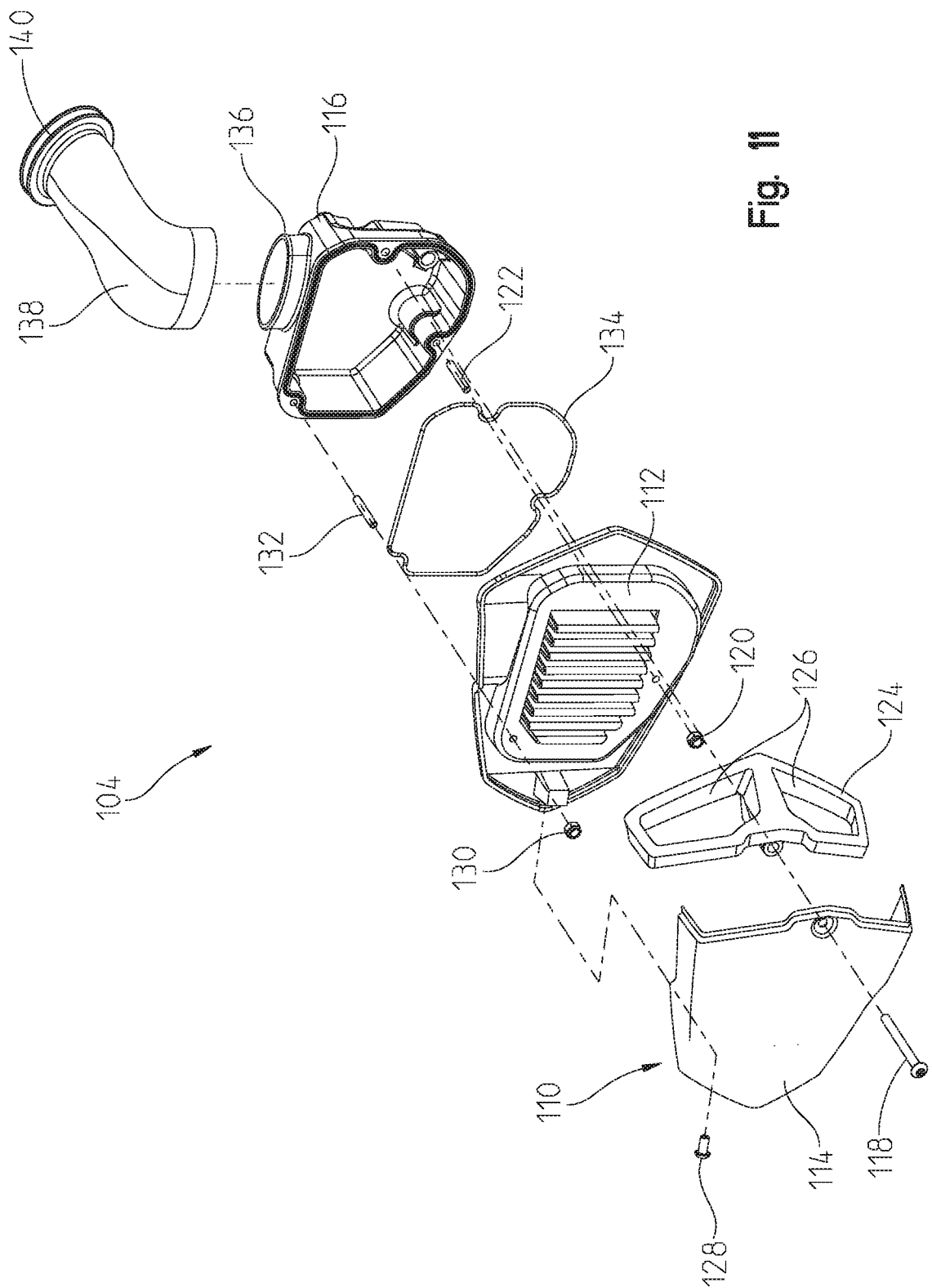
FIG. 11 is an exploded view of the accessory air intake assembly of FIG. 10.

Referring to FIGS. 10 and 11, air intake assembly 60 also may include an auxiliary or accessory air intake assembly 104 which is coupled to an opening 106 on the side of front frame portion 54. As such, accessory air intake assembly 104 is positioned laterally adjacent front frame portion 54 and at least cylinder heads 108 of engine 12 to provide a supplemental, filtered air stream into front frame portion 54. As shown in FIG. 5, if accessory air intake assembly 104 is not utilized on vehicle 2, a plug or seal 142 seals against opening 106.

Accessory air intake assembly 104 includes a housing 110 and a filter 112. Housing 110 includes a cover 114 and an air box 116. Cover 114 is coupled to air box 116 with fasteners 118, 120, 122. Housing also includes an air inlet plate 124 including at least one opening 126 for providing air to housing 110. Air inlet plate 124 is coupled to cover 114 and air box 116 through fasteners 118, 120, 122. Housing 110 generally surrounds filter 112 and cover 114 is coupled to filter 112 with a fastener 128. Air box 116 is coupled to filter 112 with fasteners 130, 132. A seal 134 is positioned intermediate filter 112 and air box 116 to sealingly couple filter 112 to air box 116. Air box 116 also includes a flange 136 for receiving a duct or conduit 138. Conduit 138 is coupled to a side surface of front frame portion 54 at opening 106 and includes a flange 140 for sealingly coupling conduit 138 to front frame portion 54. In operation, air may flow into front frame portion 54 through air intake tubes 62 and/or opening(s) 126 of accessory air intake assembly 104. If air flows into front frame portion 54 through opening(s) 126 of accessory air intake assembly 104, the air flows into housing 110 and through filter 112 to remove debris and particulate matter before flowing through air box 116 and conduit 138 into front frame portion 54. Once in front frame portion 54, the air flowing from accessory air intake assembly 104 may mix with any incoming air from air intake tubes 62 before flowing into torque tubes 66 to provide combustion air to engine 12. In one embodiment, accessory air intake assembly 104 is positioned rearward of filter 64 (FIG. 8) such that the air flowing into front frame portion 54 from accessory air intake assembly 104 bypasses filter 64 and is filtered only once through filter 112. Alternatively, accessory air intake assembly 104 may exclude filter 112 and, instead, be positioned forward of filter 64 (FIG. 8) such that the air flowing into front frame portion 54 from accessory air intake assembly 104 utilizes filter 64.

Figure 12:
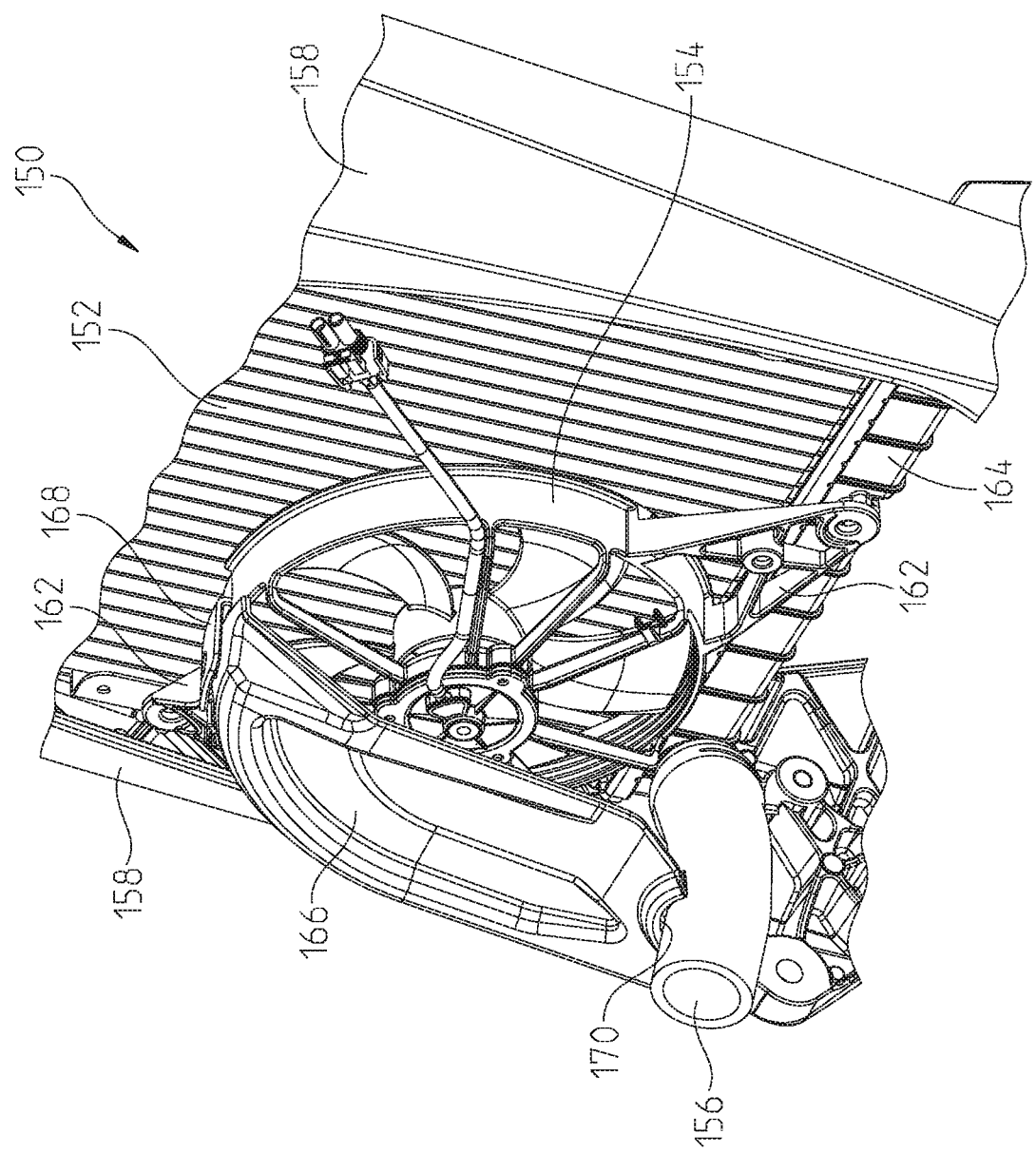
FIG. 12 is a right rear perspective view of a cooling assembly for the vehicle of FIG. 1.
Figure 13:
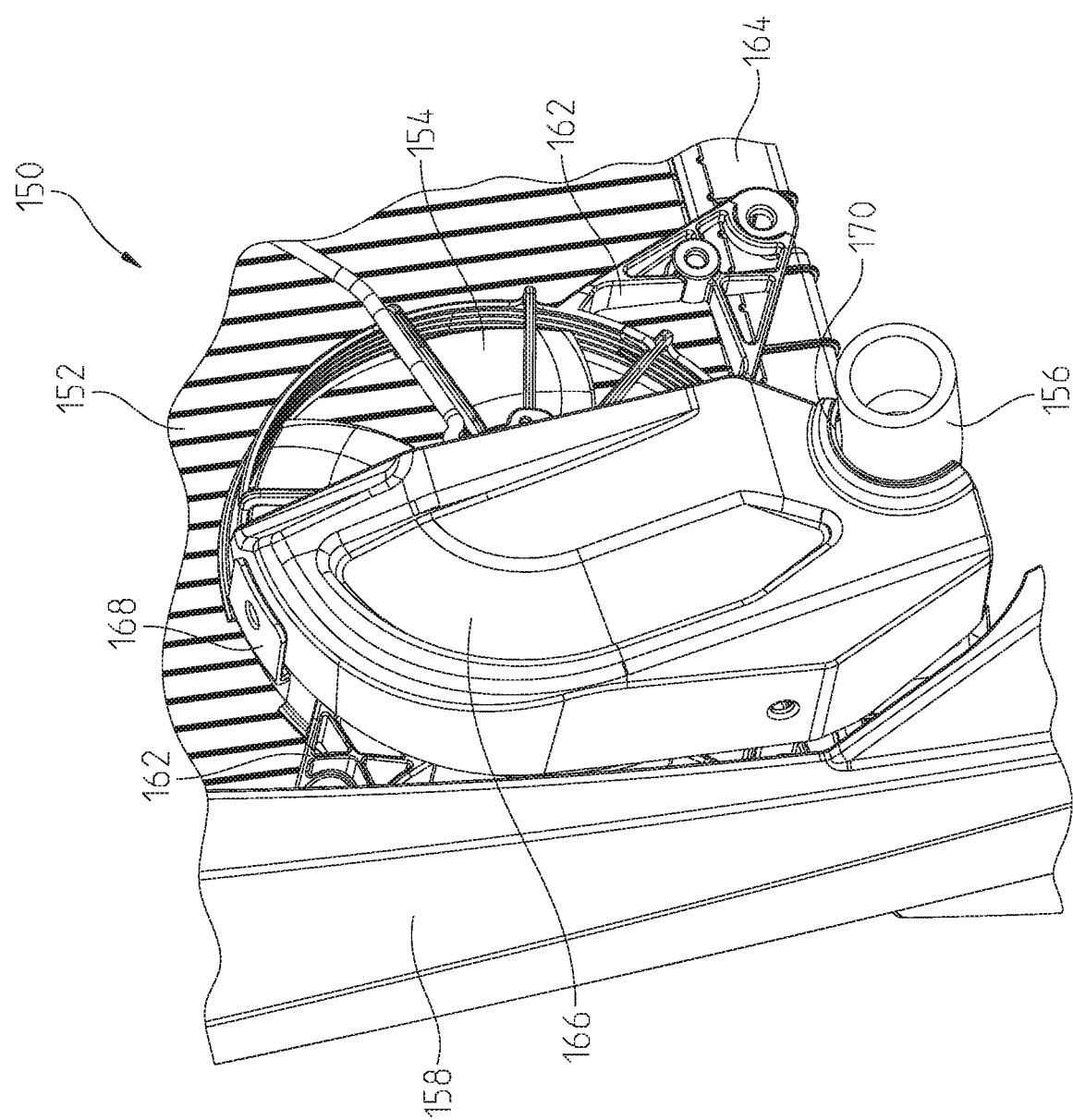
FIG. 13 is a left rear perspective view of the cooling assembly of FIG. 12.
Figure 17:
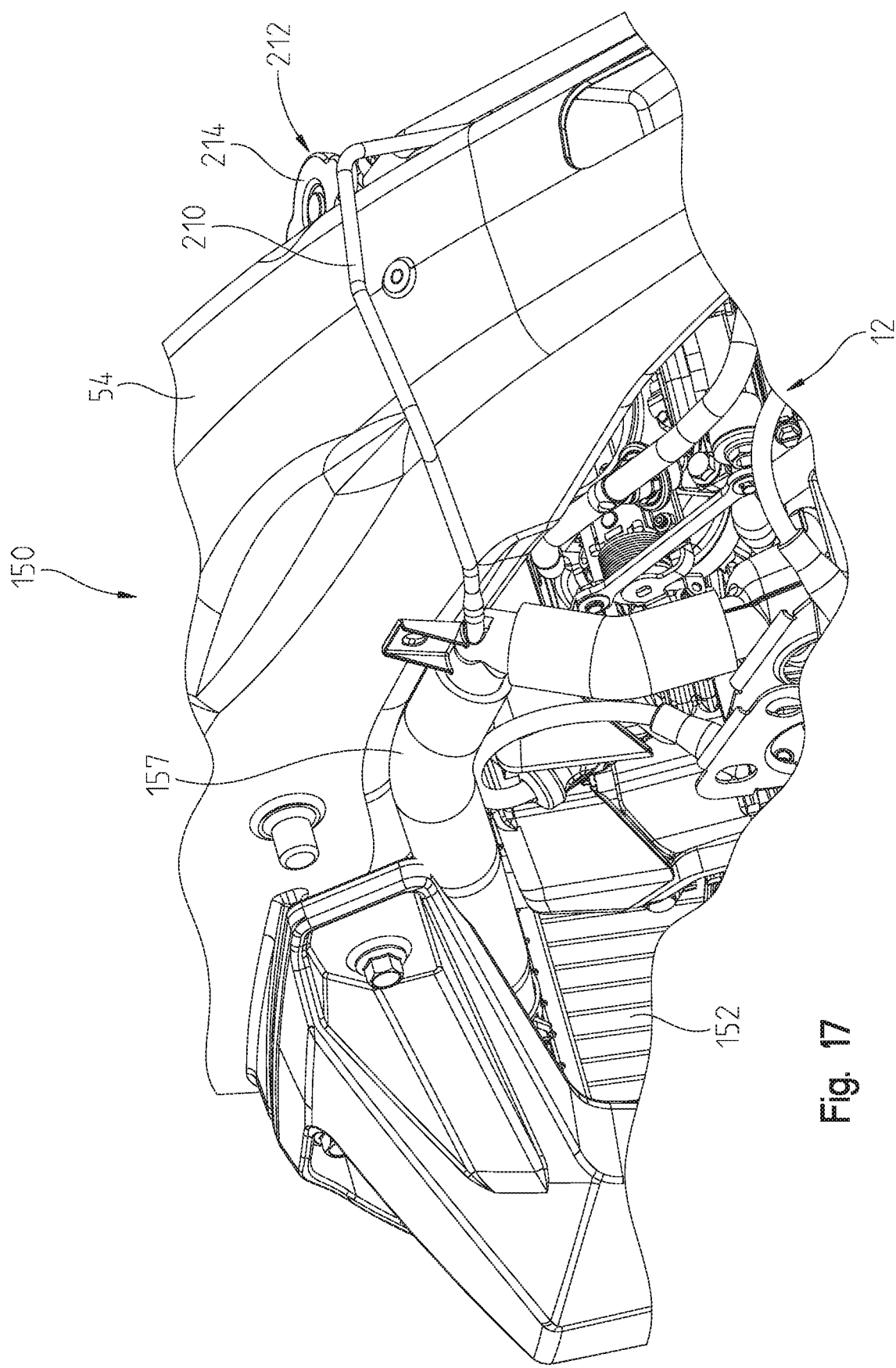
FIG. 17 is a left rear perspective view of a vent line of the cooling assembly of FIG. 12.

Referring to FIGS. 12-22, a cooling assembly 150 for vehicle 2 is shown. As shown in FIGS. 12-14, cooling assembly 150 includes a heat exchanger 152, illustratively a radiator, a fan 154, at least a first coolant conduit or line 156, and a second coolant conduit 157 (FIG. 17). Heat exchanger 152 is positioned rearward of front ground-engaging member 4 and is coupled to a portion of frame assembly 8, in particular the down tubes (not shown). Heat exchanger 152 includes a shroud or cover 158 which is positioned laterally adjacent heat exchanger 152 and generally surrounds the perimeter of heat exchanger 152.

As shown in FIGS. 14-16B, heat exchanger 152 also includes a plurality of louvers 160, each of which are angled upwardly and forwardly. For example, louvers 160 may be angled approximately 25-45° relative to a ground surface or a horizontal plane parallel to the ground surface, as denoted by angle α in FIG. 16A. More particularly, angle α of louvers 160 is approximately 39.3° relative to the horizontal plane. Angle α of louvers 160 increases the air flow to heat exchanger 152 which increases cooling of the cooling fluid (e.g., coolant, water, oil) flowing through conduit 156. Referring to FIGS. 12, 13, and 17, conduits 156, 157 are fluidly coupled to engine 12 and heat exchanger 152 to provide cooling fluid to engine 12 to decrease the temperature of engine 12 during operation thereof.

Referring to FIGS. 12 and 13, fan 154 of cooling assembly 150 is coupled to heat exchanger 152, rather than frame assembly 8. In one embodiment, fan 154 includes at least one support member 162, and illustratively two support members 162, which are coupled to a frame 164 of heat exchanger 152. As shown in FIGS. 12 and 13, fan 154 is positioned rearward of a portion of heat exchanger 152 but is not sized to conceal heat exchanger 152 in entirety.

As is also shown in FIGS. 12 and 13, a fan cover 166 is positioned rearward of a portion of fan 154. Cover 166 is removably coupled to fan 154 with a fastener (not shown) received through a portion of cover 166 and a mounting bracket 168 on fan 154. Cover 166 includes a recess or cut-out 170 which receives a portion of conduit 156. In this way, cover 166 is supported only on fan 154 and conduit 156 but is not coupled to frame assembly 8 of vehicle 2.

Figure 15:
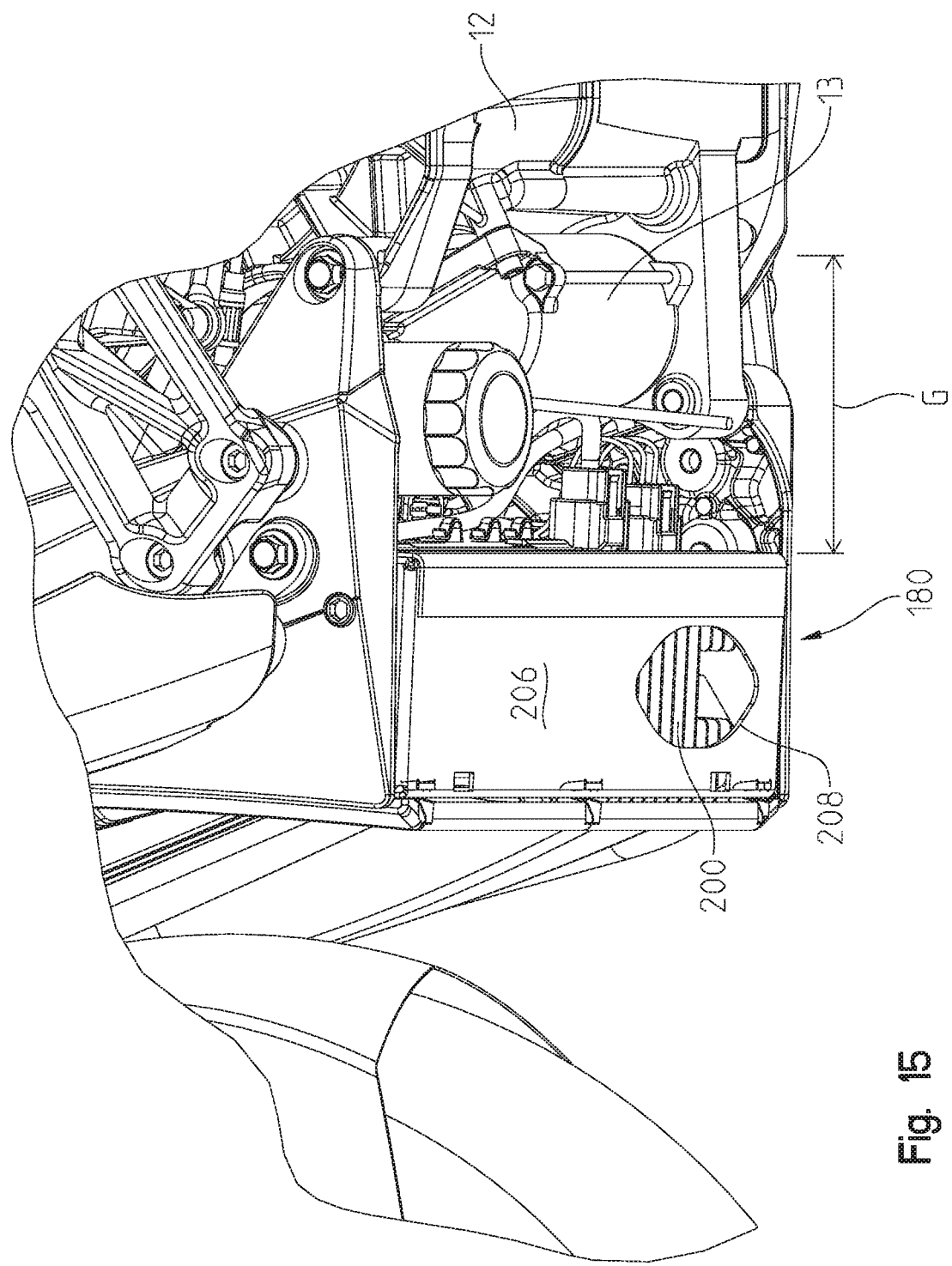
FIG. 15 is a bottom perspective view of an air gap between a compartment or battery box and the engine of the vehicle of FIG. 1.
Figure 16A:
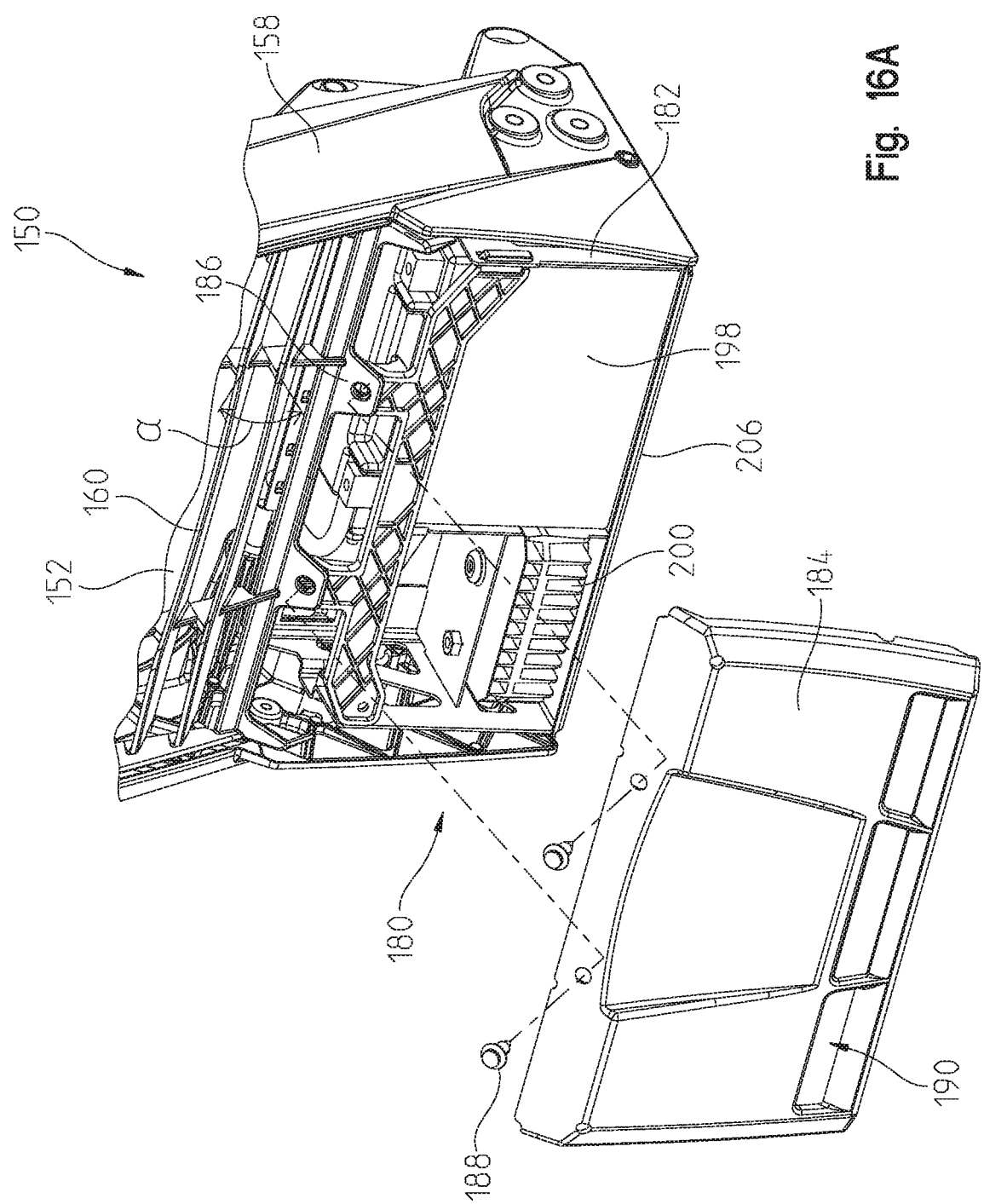
FIG. 16A is an exploded view of the compartment of FIG. 14.

Cover 166 is sized to conceal only a portion of fan 154. More particularly, cover 166 conceals approximately half of fan 154 but does not fully conceal the entire circumference of fan 154. In this way, cover 166 is a partial cover which extends from an outer surface of fan 154 to approximately a center point or axis of rotation of fan 154, thereby leaving the other half of fan 154 exposed. The size and position of cover 166 directs air from fan 154 in a downward direction within a gap defined between heat exchanger 152 and engine 12, rather than allowing the air from fan 154 to flow directly rearward. In particular, because cover 166 conceals a portion of fan 154, cover 166 prevents at least a portion of air flowing through fan 154 from flowing directly rearwardly and, instead, some of the air flowing through fan 154 contacts the inner surface of cover 166 and is directed downwardly. Illustratively, as shown in FIG. 15, an air gap G is defined between compartment or battery box 180 of vehicle 2 and engine 12 of vehicle 2 which allows air be directed downward into this air gap G by cover 166. Once the air is directed downward by cover 166, the air flows rearward below vehicle 2, thereby bypassing the driver. By directing some of the air from fan 154 downwardly, the warm/hot air flowing from fan 154 is directed away from the driver and does not flow directly rearwardly to the driver. Therefore, cover 166 provides comfort to the driver by directing warm/hot air away from the driver but also exposes approximately half of fan 154 to maintain sufficient cooling for engine 12. Because fan 154 is positioned rearward of a portion of fan 154 and fan 154 is positioned only over a portion of heat exchanger 152, cover 166 does not direct air flowing through any other portion of heat exchanger 152 except for the air flowing through heat exchanger 152 and fan 154.

Referring to FIG. 14, in addition to using cover 166 to direct warm/hot air away from the driver, vehicle 2 also includes a plurality of vents 172 movably coupled to lower fairing 38. Vents 172 are positioned within openings 174 of lower fairing 38 and may be moved between a fully open position in which opening 174 is fully exposed and a fully closed position in which opening 174 is fully concealed and/or sealed with vents 172. Additionally, vents 172 may be moved to any position between the fully closed and the fully open positions. Vents 172 may be moved manually by the driver or may be moved automatically by a vehicle control unit (not shown) in response to an automatic preset condition by the driver, ambient conditions, vehicle speed, or any other condition. By opening vents 172, air flow into operator area 32 is increased which may cool the driver and/or passenger when riding on vehicle 2. Additional details of vents 172 may be disclosed in U.S. patent application Ser. No. 14/077,037, filed Nov. 11, 2013, and entitled "TWO-WHEELED VEHICLE", the complete disclosure of which is expressly incorporated by reference herein.

Also, and referring still to FIG. 14, lower fairing 38 directs air toward heat exchanger 154 which increases the cooling effect to engine 12 by increasing the rate and volume of air flowing into heat exchanger 154. More particularly, lower fairing 38 includes an inner portion 39 which is angled toward heat exchanger 154 to direct air towards heat exchanger 154 rather than allowing air to flow past the rider and bypass heat exchanger 154. In one embodiment, vents 172 also define inner portion 39 of lower fairing 38. Additionally, the configuration and position of lower fairing 38 increases the low pressure zone behind heat exchanger 154 which facilitates pulling air through heat exchanger 154. In this way, the configuration and position of lower fairing 38 directs a maximum amount of air through heat exchanger 154 to increase cooling to engine 12 and also louvers 160 direct a maximum amount of air through heat exchanger 154 which also increases cooling to engine 12.

Referring to FIGS. 14-16B, vehicle 2 also includes compartment 180 of frame assembly 8 for supporting various components of vehicle 2. Compartment 180 is positioned below louvers 160 of heat exchanger 152 and forward of a starter 13 (FIG. 15) for engine 12. Illustratively, compartment 180 is coupled to cover 158 of heat exchanger 152. In one embodiment, compartment 180 may be coupled to the down tubes (not shown) of frame assembly 8.

Compartment 180 includes a housing 182 and a cover 184. Cover 184 is removably coupled to tabs 186 of housing 182 with fasteners 188. In one embodiment, cover 184 and/or housing 182 may be hingedly coupled to the down tubes (not shown) such that cover 184 and/or housing 182 pivots between an open position and a closed position similar to a glove box for a vehicle. Cover 184 also includes at least one opening 190 positioned along a lower portion thereof, however, cover 184 may include any number of openings 190 positioned along any portion of cover 184.

In one embodiment, cover 184 and housing 182 are comprised of a metallic material, for example sheet metal, however, cover 184 and housing 182 may be comprised of any suitable material for compartment 180, such as plastic. Additionally, and as shown in FIG. 16, housing 182 includes first and second internal dividing walls 192, 194 which also may be comprised of a metallic material. In one embodiment, first dividing wall 192 is positioned generally perpendicular to second dividing wall 194 and extends horizontally between an outer wall 196 of housing 182 and second dividing wall 194. Second dividing wall 194 extends vertically within housing 182 and divides housing 182 into two generally equal compartments. On a first side of second dividing wall 194 is a compartment for a battery 198 of vehicle 2 and, on a second side of second dividing wall 194, is a compartment for a voltage regulator 200 of vehicle 2. Additionally, because first dividing wall 192 further divides the second compartment, a third compartment is defined on the second side of second dividing wall 194 for a starter solenoid 202 of vehicle 2. While battery 198, voltage regulator 200, and starter solenoid 202 are illustratively positioned within compartment 180, any other components of vehicle 2 may be positioned housing 182. Housing 182 may include a retention member 204 which couples to tabs 186 for retaining at least battery 198 within housing 182.

To ensure that the vehicle components supported within compartment 180 (e.g., battery 198, voltage regulator 200, and starter solenoid 202) do not overheat, compartment 180 includes air flow openings to ensure sufficient air flow into compartment 180 to regulator the temperature therein. For example, cover 184 includes opening 190 which is positioned directly forward of voltage regulator 200 and provides a direct flow of air thereto. Additionally, a lower surface 206 of housing 182 includes an opening 208 positioned directly below voltage regulator 200 for air flow into and out of compartment 180. Because first and second dividing walls 192, 194 also have openings and there is open or fluid communication between the various compartments within housing 182, air that flows into/out of housing 182 through opening 190 and/or opening 208 also flows through the entire housing 182 to cool battery 198, voltage regulator 200, and starter solenoid 202.

Figure 18:
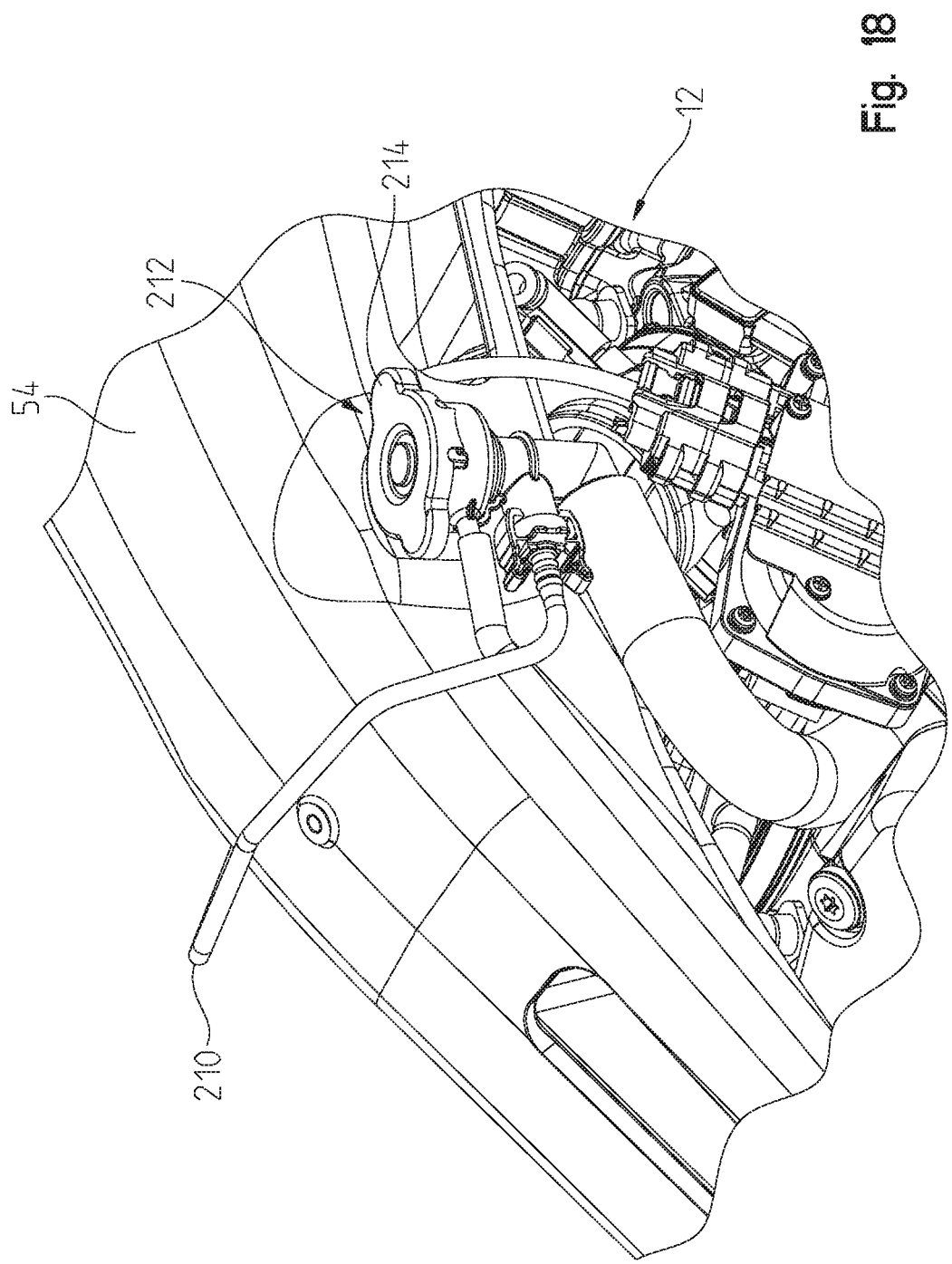
FIG. 18 is a right rear perspective view of the vent line of the cooling assembly of FIG. 17.

Referring to FIGS. 17 and 18, cooling assembly 150 also includes a vent line 210 coupled to conduit 157 which allows any air trapped within cooling assembly 150 to flow upwardly toward vent line 210 to be purged from cooling assembly 150. Illustratively, vent line 210 is fluidly coupled to conduit 157 and then extends upwardly over front frame portion 54 which allows any trapped air to flow upwardly and separate from the cooling fluid within conduit 157. Vent line 210 also bends downwardly over the right side of front frame portion 54 to fluidly couple with a release valve 212. By bending or angling vent line 210 upwardly toward the center of front frame portion 54, air within cooling assembly 150 separates from the cooling fluid and flows into vent line 210 and, by angling or bending vent line 210 downwardly over the right side of front frame portion, the air within vent line 210 becomes trapped and does not flow in a reverse direction towards conduit 157. Additionally, release valve 212 defines a low pressure portion of cooling assembly 150 and, therefore, air naturally flows within vent line 210 towards this low pressure portion of cooling assembly 150 rather than backwards towards conduit 157. Once any air within cooling assembly 150 is trapped within vent line 210 and/or at release valve 212, a pressure cap 214 of release valve 212 may be opened to purge the air from cooling assembly 150. In one embodiment, pressure cap 214 is manually opened by the rider or a mechanic, although in other embodiments, pressure cap 214 may be automatically opened or closed by the vehicle control unit or engine control unit (not shown) to purge air from cooling assembly 150 in response to any sensed conditions of engine 12 and/or vehicle 2. As shown in FIG. 18, illustratively, release valve 212 is positioned external to engine 12 and approximately longitudinally intermediate the "V" defined by the cylinders of engine 12.

Figure 19:
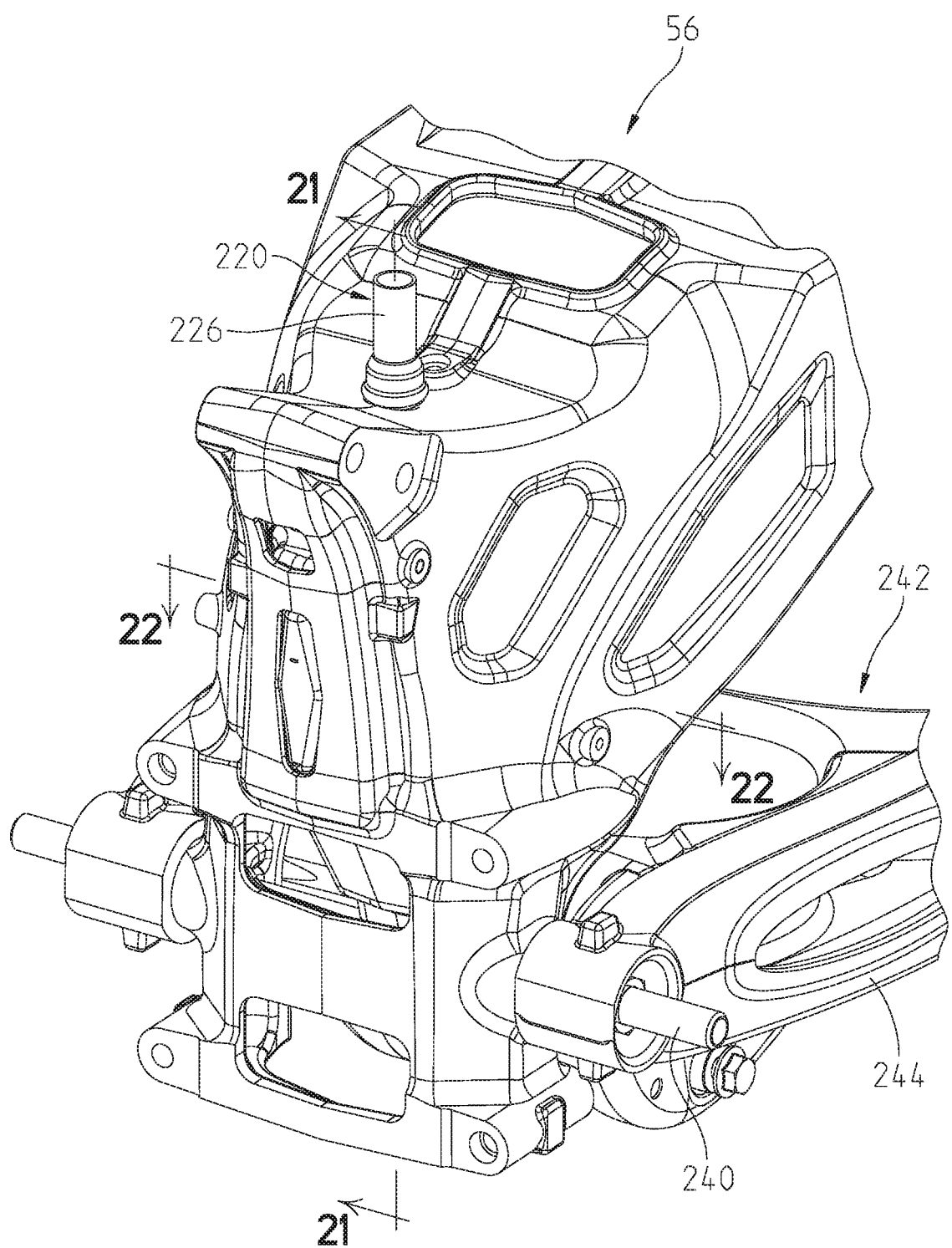
FIG. 19 is left front perspective view of a rear frame portion of the vehicle of FIG. 1 supporting a coolant bottle and a fuel vapor canister of the cooling assembly of FIG. 12.
Figure 20:
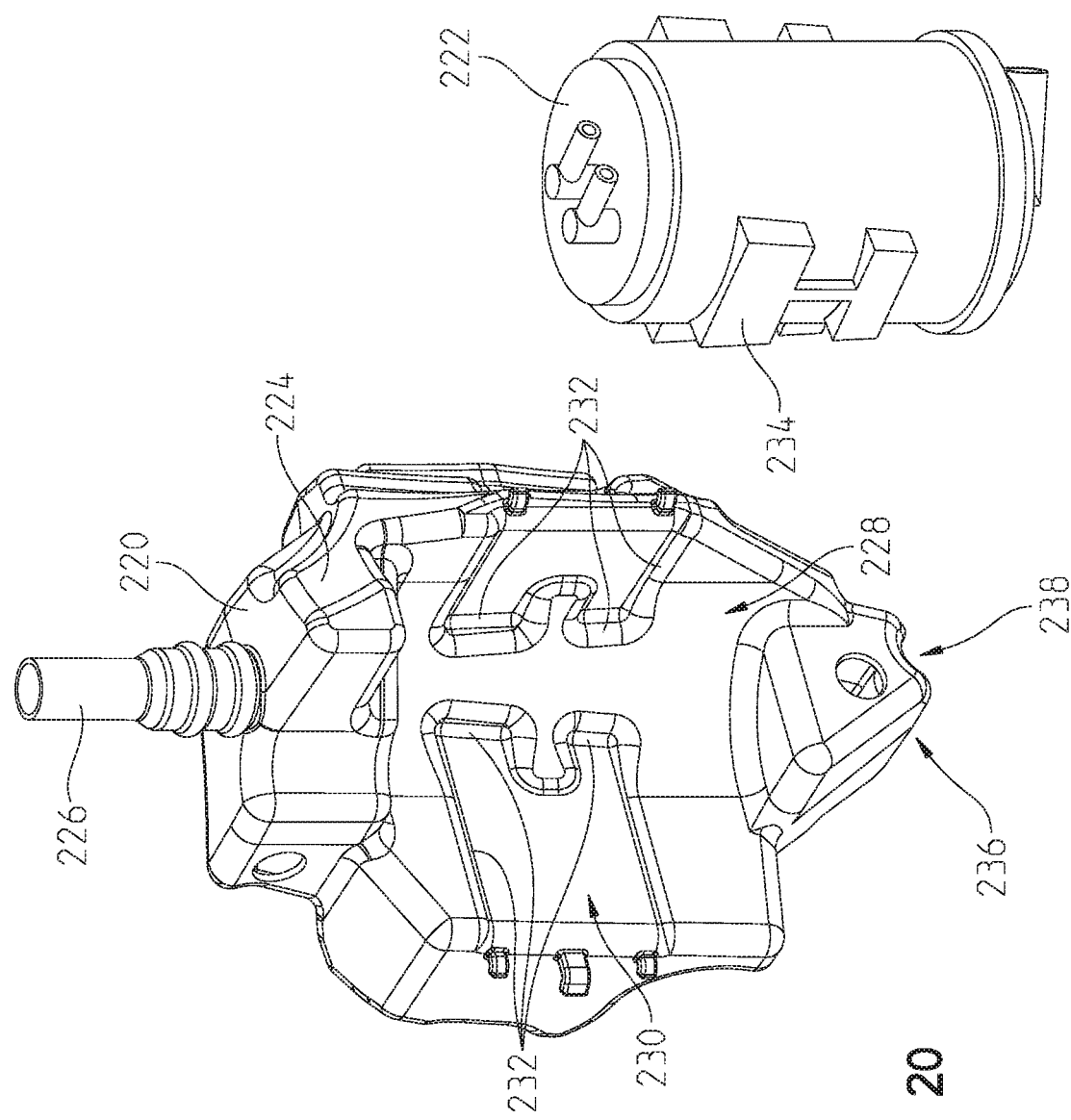
FIG. 20 is an exploded view of the coolant bottle and the fuel vapor canister of the cooling assembly of FIG. 12.

Referring to FIGS. 19-22, cooling assembly 150 further comprises a coolant bottle 220 and a fuel vapor canister 222 (e.g., an evaporation charcoal canister) which are supported within a portion of rear frame portion 56. Coolant bottle 220 includes a body 224 and a conduit 226 fluidly coupled to body 224. As shown in FIG. 19, conduit 226 extends upwardly from rear frame portion 56 and may be exposed when seat assembly 18 is removed to add more coolant to coolant bottle 220. Additionally, a lower portion 236 of body 224 includes a recess or groove 238 which is configured to receive a portion of a pivot axle 240 of a rear suspension assembly 242 of vehicle 2. In this way, coolant bottle 220 is configured to be supported on pivot axle 240 and is retained within rear frame portion 56 of frame assembly 8 without fasteners or mounting hardware, as is shown best in FIG. 21. Because coolant bottle 220 and fuel vapor canister 222 are positioned within rear frame portion 56, coolant bottle 220 and fuel vapor canister 222 are protected from dirt and debris.

Figure 21:
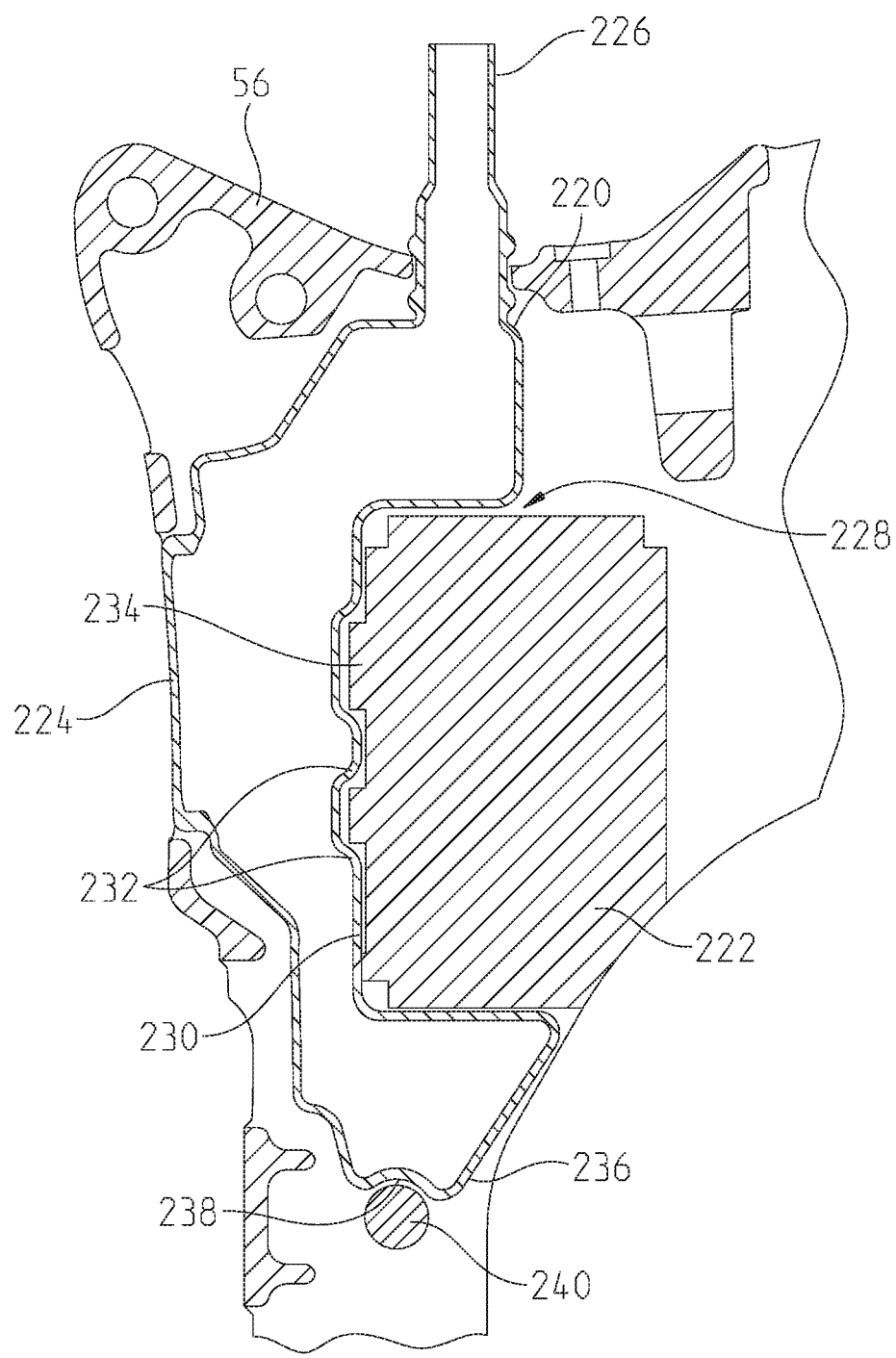
FIG. 21 is a cross-sectional view of the coolant bottle and fuel vapor canister of FIG. 20 supported by the rear frame portion of FIG. 19, taken along line 21-21 of FIG. 19.
Figure 22:
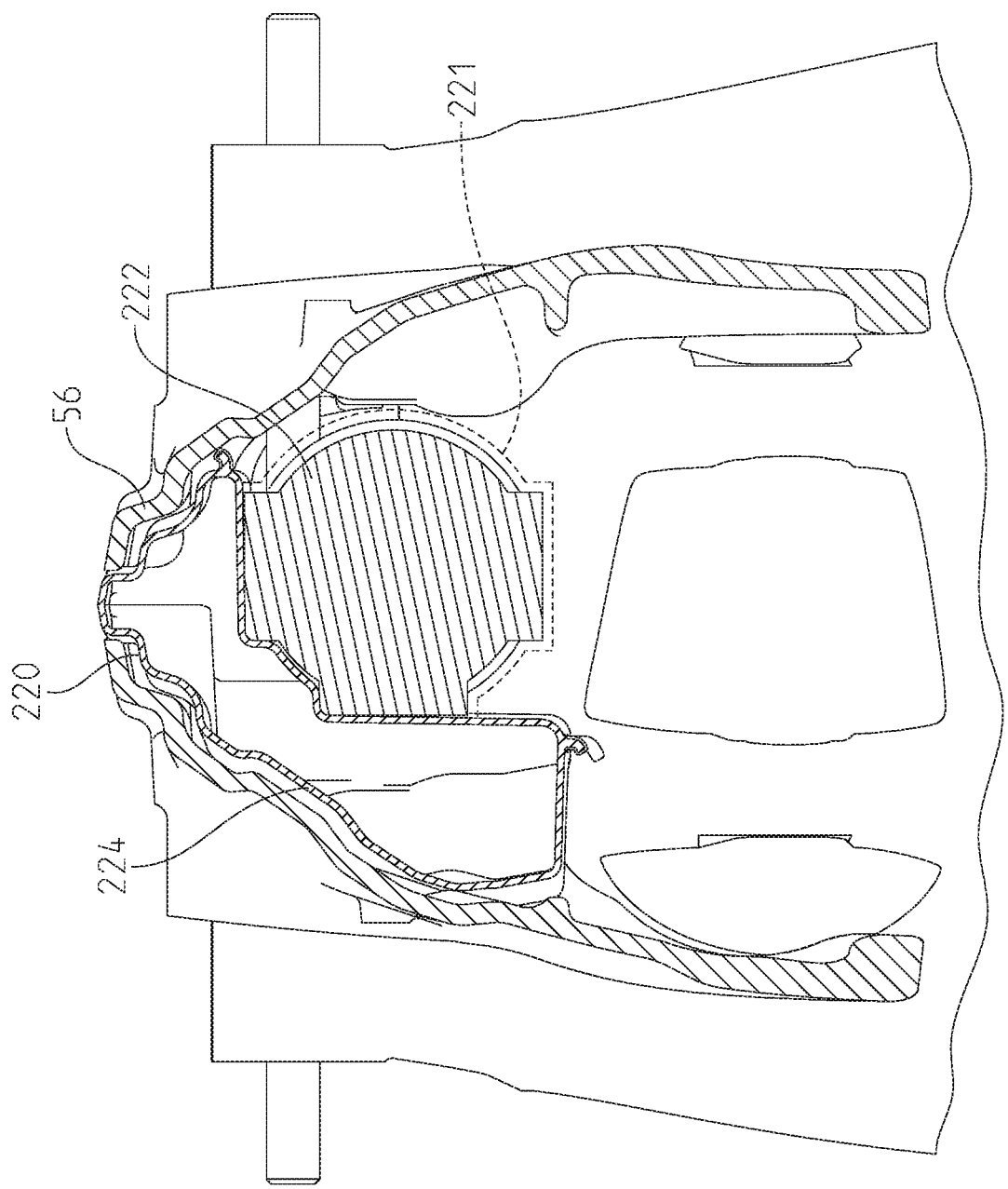
FIG. 22 is a cross-sectional view of the coolant bottle and fuel vapor canister of FIG. 20 supported by the rear frame portion of FIG. 19, taken along line 22-22 of FIG. 19.

Body 224 of coolant bottle 220 generally defines a "C" in cross-section, as shown best in FIG. 21, and includes a recess or cut-out portion 228 which is configured to receive fuel vapor canister 222. Within recess 228, body 224 includes a coupling surface 230 having shoulders 232 which are configured to receive protrusions 234 on fuel vapor canister 222. In this way, protrusions 234 on fuel vapor canister 222 can be aligned with coupling surfaces 230 on body 224 of coolant bottle 220 to retain fuel vapor canister 222 on coolant bottle 220 without additional fasteners or mounting hardware. Illustratively, however, a cord or band 221 (e.g., an elastic band) may be used to retain fuel vapor canister 222 against coolant bottle 220, as shown in FIG. 22.

Figure 23:
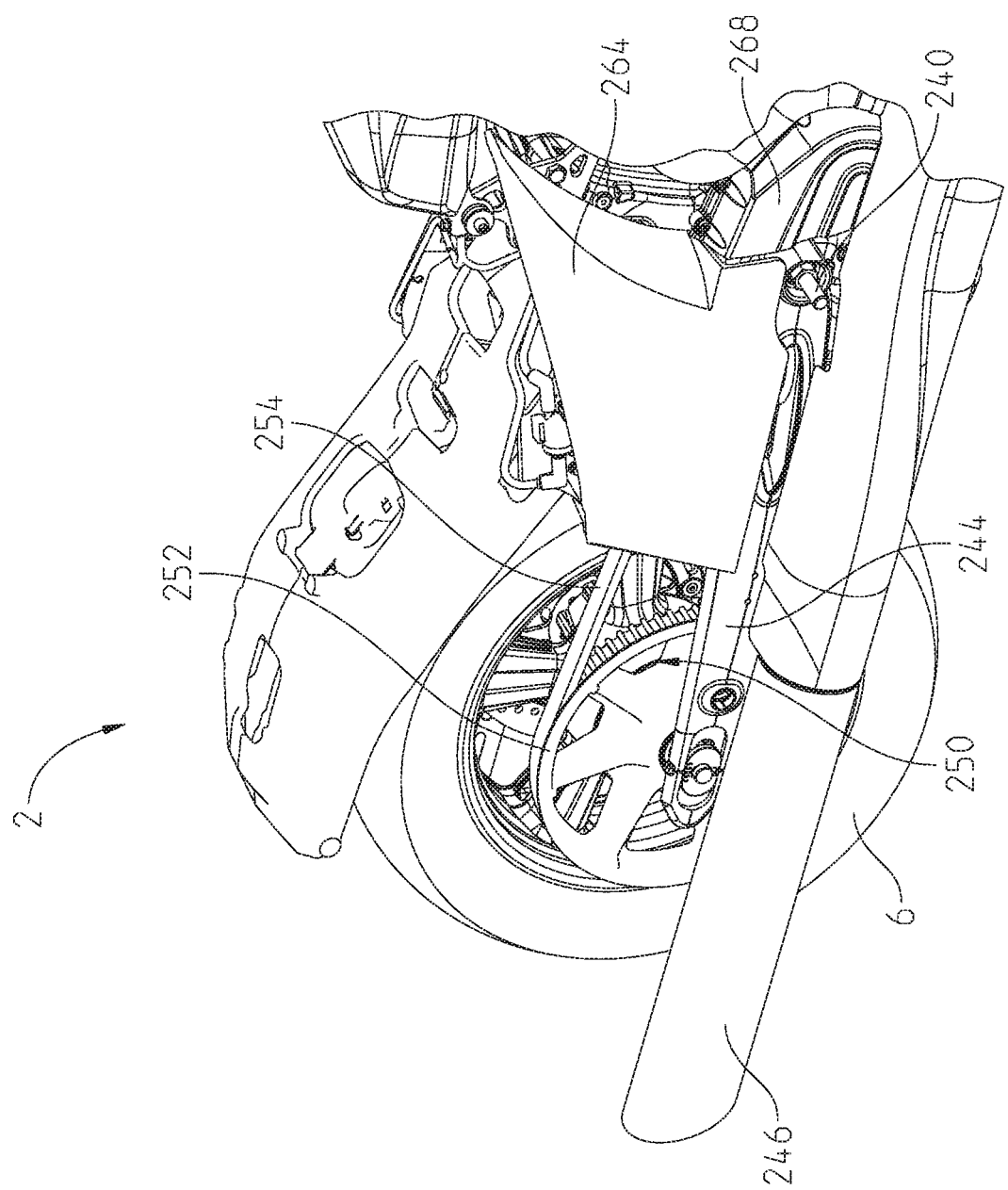
FIG. 23 is right front perspective view of a driveline of the vehicle of FIG. 1.
Figure 24:
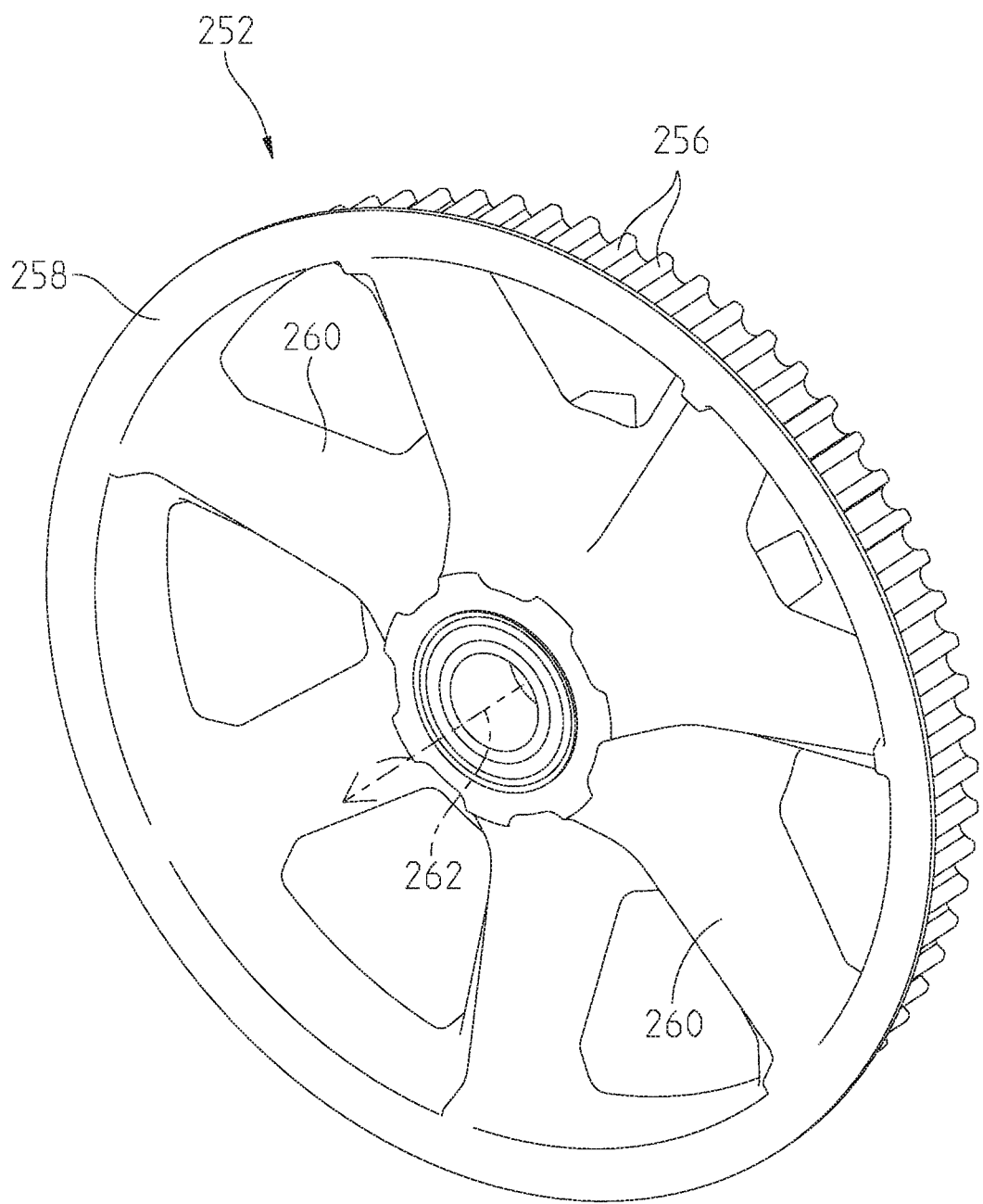
FIG. 24 is right front perspective view of a driven sprocket of the driveline of FIG. 23.

Referring to FIGS. 23 and 24, vehicle 2 includes a driveline 250 which operably couples rear ground-engaging member 6 to powertrain assembly 10. At least a portion of driveline 250 is positioned adjacent an exhaust or tail pipe 246. Additionally, a portion of driveline 250 may be operably coupled to rear suspension assembly 242, for example swing arms 244 which are configured to pivot about pivot axle 240.

Illustratively, driveline 250 includes a driven sprocket 252 coupled to rear ground-engaging member 6, a belt 254 rotatably coupled to driven sprocket 252, and a drive sprocket (not shown) operably coupled to powertrain assembly 10. The drive sprocket drives driven sprocket 252 through the rotation of belt 254 to rotate rear ground-engaging member 6. As shown in FIG. 24, driven sprocket 252 includes a plurality of teeth 256, an outer flange 258, and a plurality of spokes 260 extending radially outward from an axis of rotation 262. Teeth 256 are configured to engage teeth (not shown) on belt 254 (FIG. 23) to rotate driven sprocket 252. As shown in FIG. 24, driven sprocket 252 includes only outer flange 258 but does not include an inner flange on the opposing side of teeth 256. However, the drive sprocket (not shown) may only include an inner flange but not an outer flange. In this way, belt 254 may be removed or replaced from vehicle 2 without removing exhaust pipe 246 because the opposing flanges on the drive sprocket and driven sprocket 252 allow removing belt 254 without disassembling portions of the rear portion of vehicle 2.

Additionally, as shown in FIG. 23, body assembly 34 also includes a first driveline cover 264 which is positioned over a portion of belt 254, the drive sprocket, and swing arm 244 and a second driveline cover 268 which is positioned over at least a portion of belt 254 and the drive sprocket. Illustratively, second driveline cover 268 is a half or partial cover that abuts or at least is positioned adjacent a forward edge of first driveline cover 264. If second driveline cover 268 is removed, the drive sprocket is exposed which allows for access to belt 254 for servicing or replacing belt 254.

Additionally, second driveline cover 268 also protects belt 254 and the drive sprocket from any road debris.

Referring still to FIG. 23, first driveline cover 264 extends from below seat assembly 18 to above exhaust pipe 246 to separate driveline 250 from the driver and passenger. Additionally, first driveline cover 264 also protects belt 254 and the drive sprocket from any road debris. By positioning first driveline cover 264 above exhaust pipe 246, exhaust pipe 246 does not need to be removed from vehicle 2 when changing or servicing belt 254. Also, to further protect driveline 250 from any road debris and separate driveline 250 from any passenger on vehicle 2, exhaust pipe 264 conceals driven sprocket 252 and belt 254. As such, when belt 254 is serviced or replaced, only first and second driveline covers 264, 268 are removed from vehicle 2, thereby eliminating the need to remove exhaust pipe 246.

Figure 25:
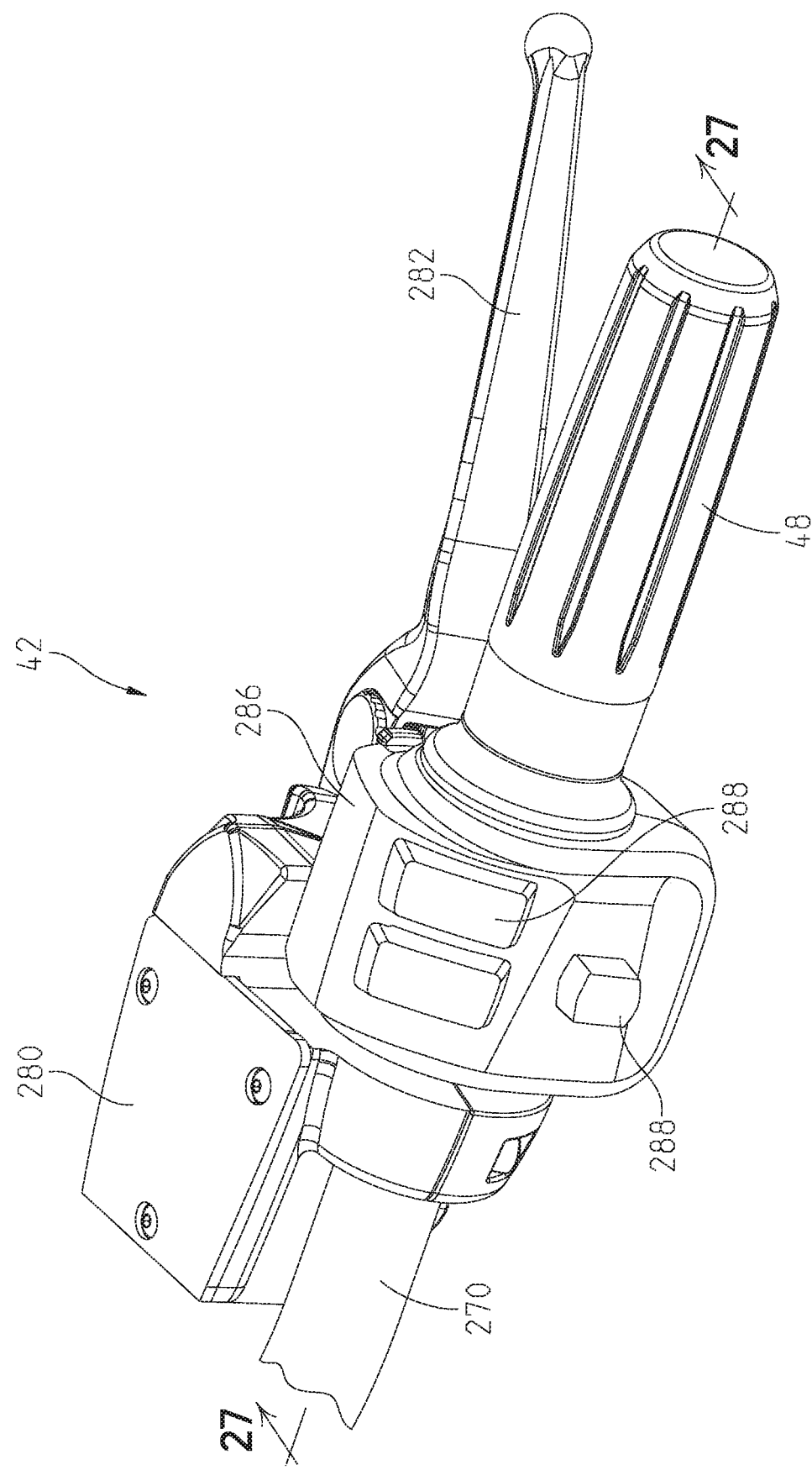
FIG. 25 is a right rear perspective view of a portion of a steering assembly of the vehicle of FIG. 1.
Figure 26:
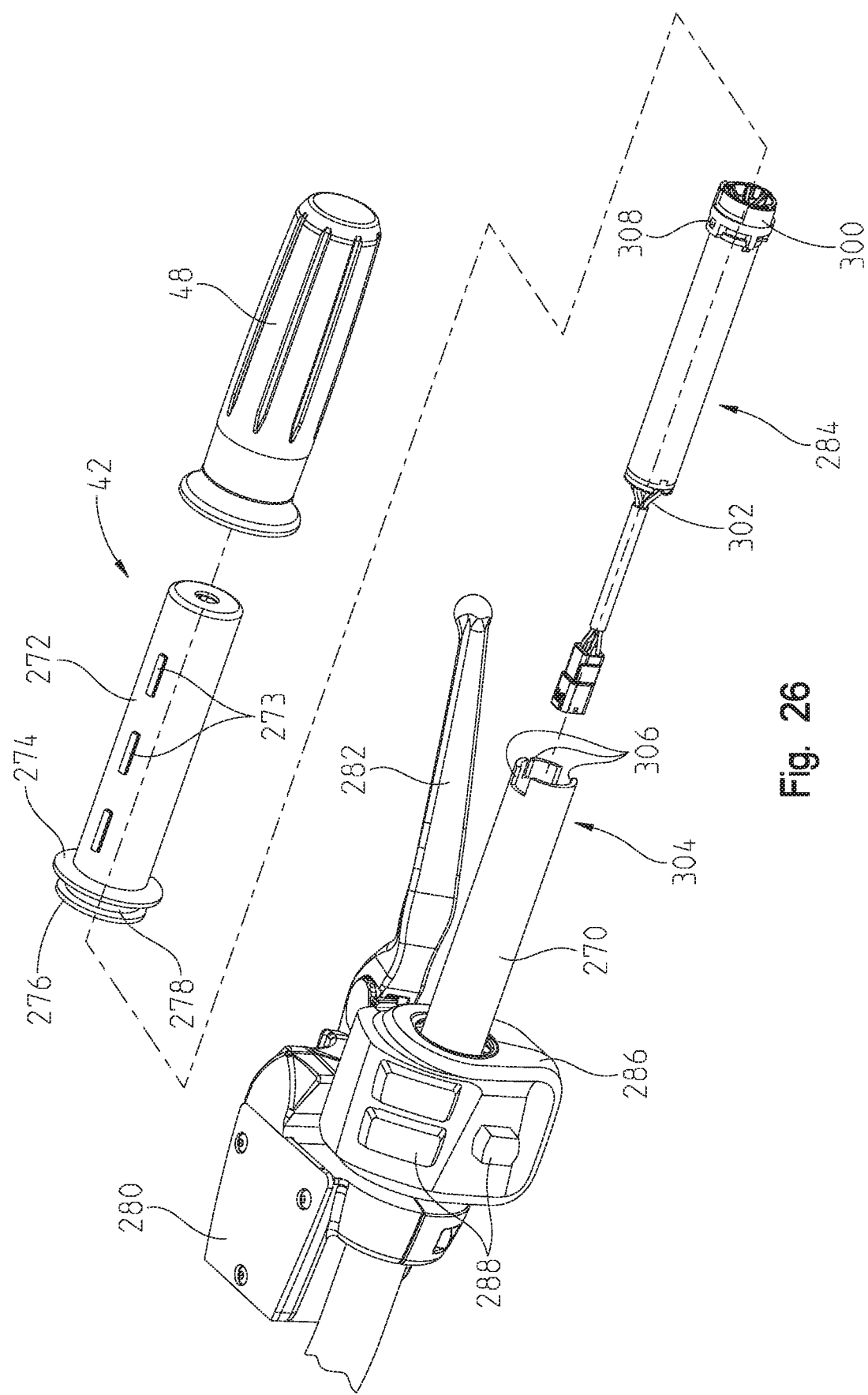
FIG. 26 is an exploded view of the portion of the steering assembly of FIG. 25.
Figure 27:
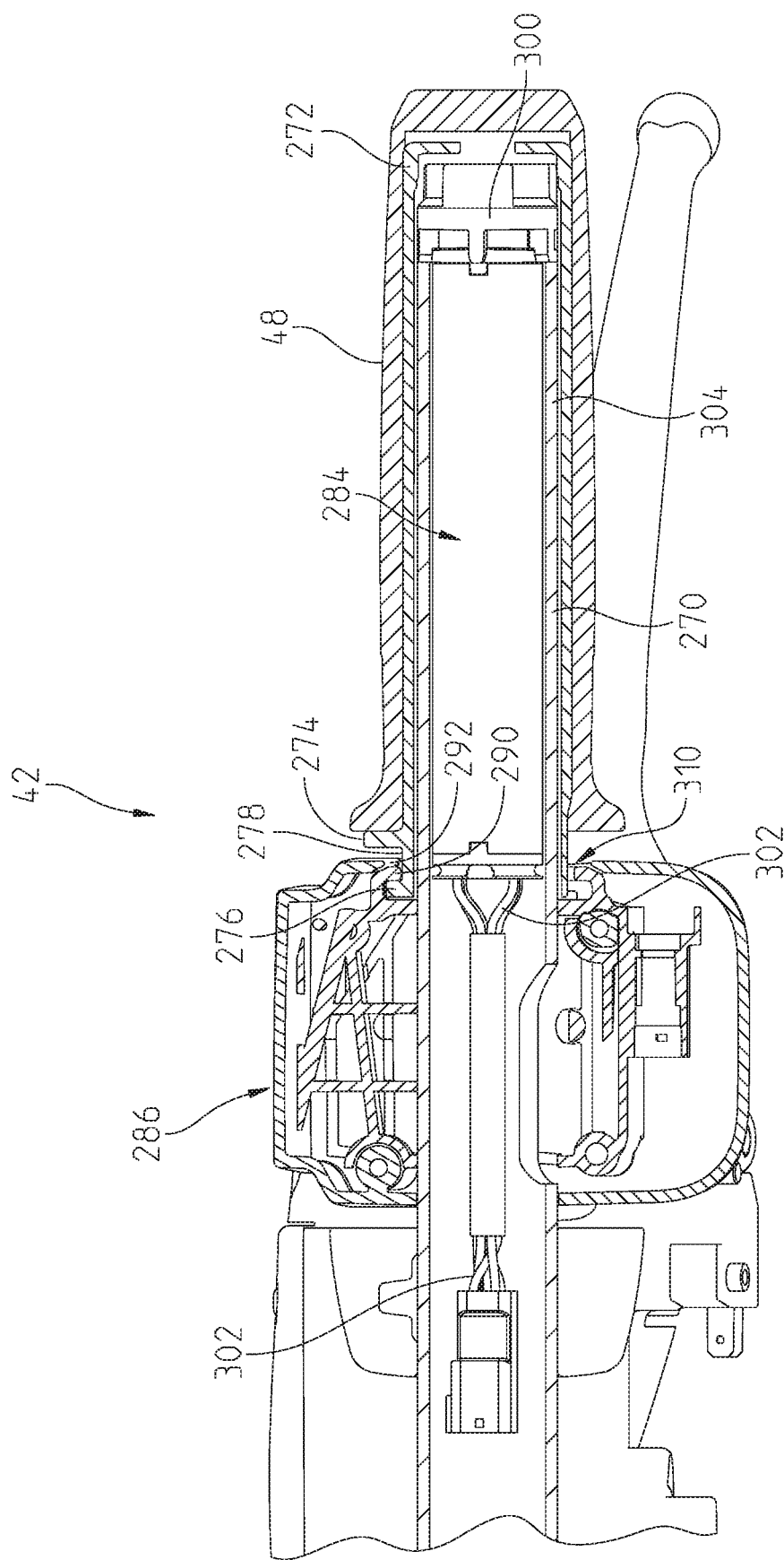
FIG. 27 is a cross-sectional view of the portion of the steering assembly of FIG. 25, taken along line 27-27 of FIG. 25.

Referring to FIGS. 25-27, a portion of steering assembly 42 is shown. Illustratively, steering assembly 42 includes two handlebars 270, each including gripping surface 48. Gripping surface 48 may be removably positioned on handlebars 270 or may be incorporated into handlebars 270. In one embodiment, steering assembly 42 includes a rotation sensor carrier 272 which is positioned inwardly from gripping surface 48 and is configured to rotate with gripping surface 48 to determine the angle or degree of rotation of gripping surface 48. More particularly, rotation sensor carrier 272 is configured to determine the angle/degree of rotation on gripping surface 48 and/or transmit the rotation data/information to another vehicle component. Also, rotation sensor carrier 272 may include a plurality of tabs 273 for overmolding rotation sensor carrier 272. In one embodiment, rotation sensor carrier 272 includes a first flange 274, a second flange 276, and a groove 278 positioned therebetween for coupling with various components of steering assembly 42, as disclosed herein. Alternatively, first flange 274 and groove 278 may be omitted such that rotation sensor carrier 272 only includes second flange 276.

In one embodiment, steering assembly 42 also may include a component, device, or mechanism (not shown) for heating gripping surfaces 48 to increase the comfort of the rider when operating vehicle 2 in cold or windy weather. Any wires or electrical connections required for heating gripping surface 48 may extend along handlebar 270 and into a switch cube 286. Additionally, a space or gap 310 is shown between a switch cube 286 and gripping surface 48 which may receive electrical wires or lines, for example, for heating gripping surface 48. In particular, any electrical lines extending through gap 310 extend into switch cube 286 and loop within switch cube 286 to provide slack in the electrical lines if the electrical lines are to rotate with rotation sensor carrier 272.

Handlebar 270 also includes a brake fluid reservoir or brake master cylinder 280 which is operably coupled to a brake lever 282 positioned external of handlebar 270 and forward of gripping surface 48. Additionally, handlebar 270 includes an electronic throttle control ("ETC") unit 284 (FIG. 26). As shown in FIGS. 26 and 27, ETC unit 284 is positioned within handlebar 270 and is spaced apart from rotation sensor carrier 272 and gripping surface 48 by handlebar 270. ETC unit 284 includes a throttle grip sensor 300 and electrical wires 302. Electrical wires 302 are positioned within handlebar 270. Throttle grip sensor 300 is coupled to an end portion 304 of handlebar 270. End portion 304 includes a plurality of notches or cut-outs 306 which are configured to receive protrusions 308 on throttle grip sensor 300. In this way, throttle grip sensor 300 is maintained in a stationary position when coupled with end portion 304 of handlebar 270. Data or information obtained by throttle grip sensor 300 is transmitted through handlebar 270 to the engine control unit (not shown) via electrical wires 302.

Steering assembly 42 also includes switch cube 286 coupled to handlebar 270 intermediate ETC unit 284 and gripping surface 48. Switch cube 286 includes a plurality of inputs 288 for adjusting or changing a condition of various components of vehicle 2 (e.g., lights, infotainment, cruise control, etc.). In one embodiment, switch cube 286 operates through a CAN, rather than through direct switching. As shown in FIG. 27, switch cube 286 provides a mounting surface for rotation sensor carrier 272 because switch cube 286 includes tabs 290, 292 which are coupled to or cooperate with second flange 276 of rotation sensor carrier 272 to retain rotation sensor carrier 272 on handlebar 270 without directly coupling rotation sensor carrier 272 to handlebar 270. In this way, switch cube 286 provides an axial bearing surface for rotation sensor carrier 272 and gripping surface 48.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
   a plurality of ground-engaging members;
   a frame supported by the ground-engaging members and including a front frame member and a rear frame member coupled to the front frame member;
   a powertrain assembly supported by the frame; and
   an air intake assembly operably coupled to the powertrain assembly and the front frame member, the air intake assembly including at least one air inlet member extending into a portion of the front frame member, an entirety of the air inlet member extending continuously from an inlet opening to an outlet opening, and a portion of the air inlet member intermediate the inlet and outlet openings having a diameter less than a diameter of the outlet opening.

2. The vehicle of claim 1, wherein the diameter of the portion of the air inlet member intermediate the inlet and outlet openings is less than a diameter of the inlet opening.

3. The vehicle of claim 1, wherein the air intake assembly includes an air filter and the air inlet member is positioned longitudinally forward of the air filter.

4. The vehicle of claim 1, wherein the at least one air inlet member includes a plurality of air inlet members, and each of the air inlet members has an equal length.

5. The vehicle of claim 1, wherein the at least one air inlet member is configured to reduce noise emanating from the air intake assembly.

6. The vehicle of claim 1, further comprising a steering assembly and the front frame member includes a head tube defining a front portion of the front frame member, the head tube is configured to operably couple with a portion of the steering assembly, and the at least one air inlet member is positioned longitudinally rearward of the head tube.

7. The vehicle of claim 1, wherein the outlet opening of the at least one inlet member is angled upwardly relative to the inlet opening.

8. The vehicle of claim 1, wherein the inlet opening of the at least one air inlet member is coupled to an underside surface of the front frame member.

9. The vehicle of claim 8, wherein the portion of the air inlet member intermediate the inlet and outlet openings is positioned adjacent the underside surface of the front frame member.

10. The vehicle of claim 1, wherein the front frame member includes a flange and the at least one inlet member includes a groove configured to receive the flange for coupling the at least one inlet member to the front frame portion.

11. The vehicle of claim 10, wherein the flange is positioned at an underside surface of the front frame member.

12. A vehicle, comprising:
a plurality of ground-engaging members;
a frame supported by the ground-engaging members and including a front frame member and a rear frame member coupled to the front frame member;
a powertrain assembly supported by the frame; and
an air intake assembly operably coupled to the powertrain assembly and the front frame member, the air intake assembly including a filter and a at least one torque tube fluidly coupled to the powertrain assembly and positioned longitudinally rearward of the filter, wherein the filter is coupled within the front frame portion and is angled rearwardly within the front frame portion.

13. The vehicle of claim 12, wherein an upper portion of the filter is angled rearwardly relative to a lower portion of the filter.

14. The vehicle of claim 13, wherein the upper portion of the filter is coupled to an upper surface of the front frame member and the lower portion of the filter is coupled to a lower surface of the front frame member.

15. The vehicle of claim 12, wherein the air intake assembly further includes at least one air inlet member extending into a portion of the front frame member and positioned longitudinally forward of the filter.

16. The vehicle of claim 15, wherein an inlet opening of the at least one air inlet member is coupled to an underside surface of the front frame member.

17. A vehicle, comprising:
a plurality of ground-engaging members;
a frame supported by the ground-engaging members and including a front frame member and a rear frame member coupled to the front frame member;
a powertrain assembly supported by the frame; and
an air intake assembly operably coupled to the powertrain assembly and the front frame member, the air intake assembly including a filter and at least one torque tube fluidly coupled to the powertrain assembly and positioned longitudinally rearward of the filter, wherein the at least one torque tube includes an air inlet positioned adjacent an upper surface of the front frame member and an air outlet positioned outside of the front frame member.

18. The vehicle of claim 17, wherein the at least one torque tube includes a flange configured to seal against a portion of the front frame member.

19. The vehicle of claim 18, wherein the flange is integral with a body of the at least one torque tube.

20. A vehicle, comprising:
a plurality of ground-engaging members;
a frame supported by the ground-engaging members and including a front frame member and a rear frame member coupled to the front frame member;
a powertrain assembly supported by the frame; and
an air intake assembly operably coupled to the powertrain assembly and the front frame member, the air intake assembly including a filter and at least one torque tube fluidly coupled to the powertrain assembly and positioned longitudinally rearward of the filter, wherein the at least one torque tube includes an inlet opening and an outlet opening, the inlet opening is positioned longitudinally forward of the outlet opening, and the outlet opening is configured to couple with a throttle body of the powertrain assembly.

21. The vehicle of claim 20, wherein the at least one torque tube is curved within the front frame member.

22. A vehicle, comprising:
a plurality of ground-engaging members;
a frame supported by the ground-engaging members and including a front frame member and a rear frame member coupled to the front frame member;
a powertrain assembly supported by the frame; and
an air intake assembly operably coupled to the powertrain assembly and the front frame member, the air intake assembly including at least one air inlet member extending into an interior volume of the front frame member, the air inlet member extending from an inlet opening to an outlet opening positioned rearward of the inlet opening and within the interior volume of the front frame member, and a portion of the air inlet member intermediate the inlet and outlet openings having a diameter less than a diameter of the outlet opening.

23. A vehicle, comprising:
a plurality of ground-engaging members;
a frame supported by the ground-engaging members and including a front frame member and a rear frame member coupled to the front frame member;
a powertrain assembly supported by the frame; and
an air intake assembly operably coupled to the powertrain assembly and the front frame member, the air intake assembly including at least one air inlet member extending into a portion of the front frame member, the air inlet member extending continuously from an inlet opening to an outlet opening, and a portion of the air inlet member intermediate the inlet and outlet openings having a diameter less than a diameter of the outlet opening,
wherein the at least one air inlet member includes a plurality of air inlet members, and each of the air inlet members has an equal length.

24. A vehicle, comprising:
a plurality of ground-engaging members;
a frame supported by the ground-engaging members and including a front frame member and a rear frame member coupled to the front frame member;
a powertrain assembly supported by the frame; and
an air intake assembly operably coupled to the powertrain assembly and the front frame member, the air intake assembly including at least one air inlet member extending into a portion of the front frame member, the air inlet member extending continuously from an inlet opening to an outlet opening, and a portion of the air inlet member intermediate the inlet and outlet openings having a diameter less than a diameter of the outlet opening,
wherein the at least one air inlet member is configured to reduce noise emanating from the air intake assembly.

25. A vehicle, comprising:
a plurality of ground-engaging members;
a steering assembly;

a frame supported by the ground-engaging members and including a front frame member and a rear frame member coupled to the front frame member, the front frame member includes a head tube defining a front portion of the front frame member, the head tube is configured to operably couple with a portion of the steering assembly;

a powertrain assembly supported by the frame; and an air intake assembly operably coupled to the powertrain assembly and the front frame member, the air intake assembly including at least one air inlet member extending into a portion of the front frame member, the air inlet member extending continuously from an inlet opening to an outlet opening, and a portion of the air inlet member intermediate the inlet and outlet openings having a diameter less than a diameter of the outlet opening, and the at least one air inlet member is positioned longitudinally rearward of the head tube.

26. A vehicle, comprising:

a plurality of ground-engaging members;

a frame supported by the ground-engaging members and including a front frame member and a rear frame member coupled to the front frame member;

a powertrain assembly supported by the frame; and an air intake assembly operably coupled to the powertrain assembly and the front frame member, the air intake assembly including at least one air inlet member extending into a portion of the front frame member, the air inlet member extending continuously from an inlet opening to an outlet opening, and a portion of the air inlet member intermediate the inlet and outlet openings having a diameter less than a diameter of the outlet opening, wherein the inlet opening of the at least one air inlet member is coupled to an underside surface of the front frame member, and wherein the portion of the air inlet member intermediate the inlet and outlet openings is positioned adjacent the underside surface of the front frame member.

* * * * *